US008781883B2

(12) United States Patent
Whitaker et al.

(10) Patent No.: US 8,781,883 B2
(45) Date of Patent: Jul. 15, 2014

(54) TIME MOTION METHOD, SYSTEM AND COMPUTER PROGRAM PRODUCT FOR ANNOTATING AND ANALYZING A PROCESS INSTANCE USING TAGS, ATTRIBUTE VALUES, AND DISCOVERY INFORMATION

(75) Inventors: Justin Whitaker, Atlanta, GA (US); John Morris, Evanston, IL (US)

(73) Assignee: Level N, LLC, Evanston, IL (US)

( * ) Notice: Subject to any disclaimer, the term of this patent is extended or adjusted under 35 U.S.C. 154(b) by 796 days.

(21) Appl. No.: 12/415,128

(22) Filed: Mar. 31, 2009

(65) Prior Publication Data

US 2010/0250304 A1 Sep. 30, 2010

(51) Int. Cl.
*G06Q 10/00* (2012.01)
*G06Q 10/06* (2012.01)

(52) U.S. Cl.
CPC .... *G06Q 10/06393* (2013.01); *G06Q 10/06395* (2013.01); *G06Q 10/0639* (2013.01); *G06Q 10/06375* (2013.01); *G06Q 10/0637* (2013.01); *G06Q 10/0633* (2013.01); *G06Q 10/06316* (2013.01)
USPC ....... 705/7.39; 705/7.41; 705/7.38; 705/7.37; 705/7.36; 705/7.27; 705/7.26

(58) Field of Classification Search
CPC ................. G06Q 10/06393; G06Q 10/06395; G06Q 10/0639; G06Q 10/06375; G06Q 10/0637; G06Q 10/0633; G06Q 10/06316
USPC .......... 705/7.39, 7.41, 7.38, 7.37, 7.36, 7.27, 705/7.26
See application file for complete search history.

(56) References Cited

U.S. PATENT DOCUMENTS

| 5,317,628 | A | * | 5/1994 | Misholi et al. ............. 379/88.14 |
| 5,465,286 | A | | 11/1995 | Clare et al. |
| 5,818,907 | A | * | 10/1998 | Maloney et al. ........... 379/32.01 |
| 6,513,046 | B1 | * | 1/2003 | Abbott et al. .......... 707/999.104 |
| 6,665,395 | B1 | * | 12/2003 | Busey et al. ............. 379/265.09 |

(Continued)

FOREIGN PATENT DOCUMENTS

| JP | 2003298748 | * 10/2003 |
| JP | 2003298748 A2 | 10/2003 |

OTHER PUBLICATIONS

Applied Computer Services Inc, Time Pro Professional, Oct. 17, 2006 retrieved from web.archive.org, archive date Oct. 17, 2006.*

(Continued)

*Primary Examiner* — Justin M Pats
*Assistant Examiner* — Octavian Rotaru
(74) *Attorney, Agent, or Firm* — Fiala & Weaver P.L.L.C.

(57) ABSTRACT

Process studies are performed to determine improvements to processes, such as manufacturing or service related processes. One or more instances of a process may be captured (e.g., recorded) and annotated. A user is enabled to interact with a recording included in the process instance of a process being performed. The user is enabled to apply a process step tag selected from a plurality of process steps to a section of the recording. The user may be enabled to interact with the recording to apply an attribute value selected from a list of attribute values to the process instance. The user may be enabled to interact with the recording to apply discovery information to the process instance. Annotation information associated with the process instance is generated that includes the process step tag, any applied attribute values, and any applied discovery information.

15 Claims, 19 Drawing Sheets

(56) References Cited

U.S. PATENT DOCUMENTS

| | | | |
|---|---|---|---|
| 6,707,904 B1* | 3/2004 | Judkins et al. | 379/265.06 |
| 6,711,253 B1* | 3/2004 | Prabhaker | 379/265.01 |
| 7,213,209 B2* | 5/2007 | Lueckhoff | 715/747 |
| 7,356,563 B1* | 4/2008 | Leichtling et al. | 709/204 |
| 7,788,679 B2* | 8/2010 | Chen et al. | 719/318 |
| 2001/0032120 A1* | 10/2001 | Stuart et al. | 705/11 |
| 2002/0097256 A1* | 7/2002 | Miller et al. | 345/723 |
| 2003/0204435 A1* | 10/2003 | McQuilkin et al. | 705/10 |
| 2004/0125124 A1* | 7/2004 | Kim et al. | 345/716 |
| 2005/0071178 A1* | 3/2005 | Beckstrom et al. | 705/1 |
| 2006/0188075 A1* | 8/2006 | Peterson | 379/67.1 |
| 2006/0188085 A1* | 8/2006 | Ricketts | 379/265.06 |
| 2007/0094590 A1* | 4/2007 | Malkin et al. | 715/512 |
| 2007/0136118 A1* | 6/2007 | Gerlach et al. | 705/8 |
| 2007/0206766 A1* | 9/2007 | Keren et al. | 379/265.01 |
| 2008/0144801 A1* | 6/2008 | Donnelly | 379/265.09 |
| 2009/0183102 A1* | 7/2009 | Hernandez et al. | 715/771 |

OTHER PUBLICATIONS

Applied Computer Services Inc, Time Pro Professional, Oct. 17, 2006.*

Applied Computer Services Inc, Time Pro Professional, OCt. 17, 2006 http://www.acsco.com/Video.htm.*

Chamberlain et al, IBM WebSphere Voice Server, Customer Voice Portal, an Interoperability Guide (selected pages), REDP 402500, 2006.*

* cited by examiner

TIME MOTION METHOD, SYSTEM AND COMPUTER PROGRAM PRODUCT FOR ANNOTATING AND ANALYZING A PROCESS INSTANCE USING TAGS, ATTRIBUTE VALUES, AND DISCOVERY INFORMATION

BACKGROUND OF THE INVENTION

1. Field of the Invention

The present invention relates to the decomposition, annotation, and analysis of processes.

2. Background

Many businesses provide products and/or services according to processes. For instance, processes may be used to generate products, and services may be provided according to processes. The efficiency of such processes is typically of great importance to businesses. More efficient processes enable businesses to provide better service and higher quality products, as well as enabling cost savings and greater profitability. As such, large amounts of attention and resources are allocated by businesses to the control and improvement of processes. One reason for controlling a process is to ensure a predictable outcome, such as a consistent thickness, a consistent cycle time, a consistent quality, etc. Measuring a process helps identify drivers of variation and possibilities for improvement.

Techniques for measuring, analyzing, detecting, and correcting deviations in processes have been devised. The implementation of such techniques is most apparent in manufacturing environments that lend themselves to careful measurement and control techniques. During the early portion of the industrialization of the United States, the scientific method was applied to manufacturing processes in an attempt to find a one best way of performing a particular task. Parameters such as reach, turn, and grasp steps were measured in distance and time. Time and motion studies sought to measure these parameters through disciplined observation, recording of resulting data, and analysis of the data to arrive at an improved arrangement of people, materials, and machines. More recent examples of quality control techniques applied to manufacturing include statistical process control ("SPC"), six sigma, lean manufacturing, and other SPC-based methodologies. These approaches are rooted in measurement, such as the measurement of process outcomes, defect rates, cycle times, means, standard deviations, and/or further metrics.

Techniques have also been devised to help maintain and improve quality in service industries. Such techniques also involve the measurement of service-related metrics, and frequently revolve around training and observation. Unlike manufacturing, service organizations deal with an inherently dynamic and less predictable raw material: interactions with customers. Customers can, and do, make irrational requests, change their minds, make mistakes, and generally behave in ways that never cease to astonish, let alone lend themselves to rigid predictability. When the unpredictability of customers is combined with increasingly sophisticated and varied service offerings, the resulting customer service processes greatly increase measurement complexity.

Accordingly, further ways for improving process quality in manufacturing and service industry environments are desired. For instance, with regard to service industries, techniques for analyzing and improving process quality in interactions with customers are desired.

BRIEF SUMMARY OF THE INVENTION

Process studies are performed to determine improvements to processes, such as manufacturing or service related processes. As part of the process study, recordings of the process under study may be recorded. A recording of the process being performed may be referred to as a "process instance." An audio and/or a video recording may be made of the process, and included in a process instance. The process instance may be annotated (to generate annotation information) to enable the process to be analyzed in a more efficient manner. Annotation information generated for the process instance, along with annotation information generated for further process instances of the process, may be analyzed to determine an effectiveness of the process, as well as to determine potential improvements to the process.

In one implementation, a method for annotating a process instance is provided. A user is enabled to interact with a recording included in the process instance of process being performed. For instance, the process being performed may include a first person (e.g., an agent, customer service provider/representative, etc.) interacting with a second person (e.g., a customer, actual or potential) and/or with a machine, or may include one or more machines performing the process. The user is enabled to apply a process step tag indicating a process step selected from a plurality of predefined process steps to a section of the recording, thus annotating that section of the recording as being representative of the predefined process step. The user may also be enabled to interact with the recording to apply an attribute value selected from a list of attribute values to the process instance, including being applied to the process instance as whole or to a particular process step of the process instance. Still further, the user may be enabled to interact with the recording to apply discovery information to the process instance. Annotation information associated with the process instance is generated that includes the process step tag, any applied attribute values, and any applied discovery information. The annotation information, including the process step tag, applied attribute values, and applied discovery information may be subsequently analyzed.

In another implementation, a process annotation system is provided. The process annotation system includes a user interface generator. The user interface generator includes a recording player module and a process step tag module. The recording player module is configured to enable a user to interact with a recording of a process being performed included in a process instance. The process step tag module is configured to generate a process step tag interface configured to enable the user to apply a process step tag indicating a process step selected from a plurality of process steps to a section of the recording. The user interface module is configured to generate annotation information associated with the process instance that includes the process step tag.

Furthermore, the user interface generator may include an attributes applicator module configured to generate an attributes interface configured to enable the user to apply an attribute value selected from a list of attribute values to the process instance. The user interface module is configured to generate the annotation information associated with the process instance to include the process step tag and the selected attribute value.

Still further, the user interface generator may include a discoveries applicator module configured to generate a discoveries interface configured to enable the user to apply discovery information to the process instance. The user interface module is configured to generate the annotation information associated with the process instance to include the process step tag and the discovery information.

In one implementation, the recording may be an audio recording. The recording player module may be configured to enable the user to play the audio recording. The process step tag module is configured to enable the user to select the process step tag based on a content of the audio recording during the section.

In another implementation, the recording may be a video recording. The recording player module is configured to enable the user to play the video recording. The process step tag module is configured to enable the user to select the process step tag based on a content of the video recording during the section.

Computer program products are also described herein. The computer program products include a computer-readable medium having computer program logic recorded thereon for enabling process studies to be performed, including configuring a process study, measuring processes to generate process instances, annotating process instances, and analyzing annotated process instances.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
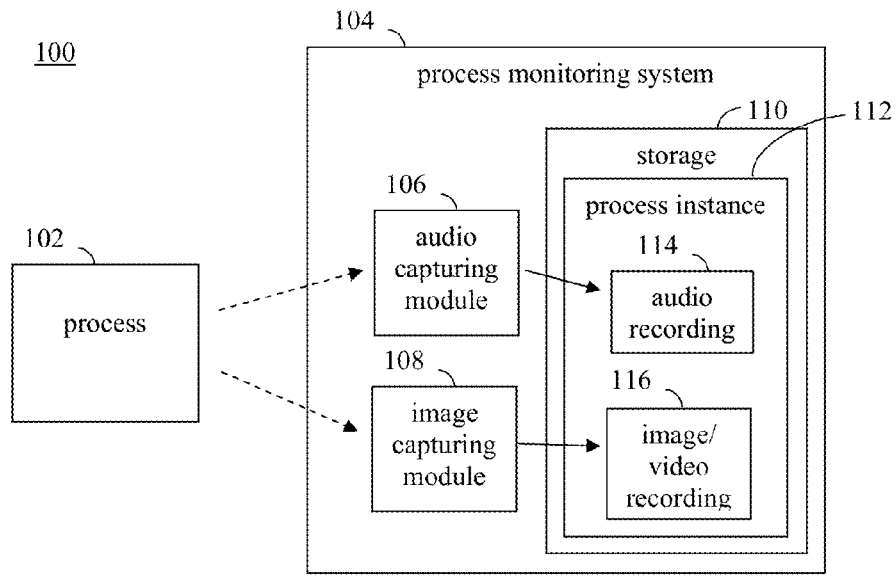
FIG. 1 shows a block diagram of a process environment, according to an example embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments of the Present Invention

Embodiments of the present invention relate to techniques for configuring process studies, and to decompiling, measuring, annotating, and analyzing processes to enable improvements to be made to the processes. Embodiments of the present invention relate to many different types of processes, including manufacturing processes and service industry processes. In a typical manufacturing process, one or more machines, tools, and labor (e.g., human) may be used to transform goods and/or to produce/fabricate products for sale. Example categories of manufacturing include pharmaceuticals, construction, electronics, engineering, energy, food and beverage, industrial design, metalworking, metal casting, plastics, telecommunications, and textiles. In a typical service industry process, persons interact in a manner to serve a customer. Example categories of the service industry include insurance, government, tourism, banking, retail, legal services, education, waste disposal, the hospitality industry, communications, entertainment, and social services.

Embodiments of the present invention are directed towards these and further types of manufacturing and service industry processes.

Example embodiments of the present invention are described in detail in the following subsections. In the next subsection, example process monitoring embodiments are described, followed by a section describing example process annotating embodiments, which is followed by a section describing overall process flows for configuring and implementing a process study.

A. Example Process Monitoring Embodiments

An instance of a process, or "process instance," is a captured occurrence of a process being performed in its typical environment. In an embodiment, a recording of a process being performed may be made, and the recording may be included in an instance of the process and/or may define the instance of the process. The process instance, including the recording, may be analyzed to enable improvements to be made to the process. For example, FIG. 1 shows a block diagram of a process environment 100, according to an example embodiment. As shown in FIG. 1, process environment 100 includes a process 102 and a process monitoring system 104. Process 102 may be any type of process, including a manufacturing or service process. Process monitoring system 104 is configured to monitor process 102 while it is being performed, to capture an instance of the process. For example, process monitoring system 104 may be configured to make a recording of process 102. As shown in FIG. 1, process monitoring system 104 may include an audio capturing module 106, an image capturing module 108, and storage 110. Either or both of audio capturing module 106 and image capturing module 108 may be present in process monitoring system 104, in embodiments.

Audio capturing module 106 is configured to record audio associated with process 102. For instance, audio capturing module 106 may record the voice of one or more persons participating in process 102, and/or any other sounds related to process 102. Audio capturing module 106 generates an audio recording 114, which may be stored in storage 110. Audio capturing module 106 may include any type of audio capturing device, including a tape recorder, a recorder that stores audio in digital form, or other type of audio capturing device. In an embodiment, audio capturing module 106 may be integrated in a computer to record audio streaming to and from the computer.

Image capturing module 108 is configured to record images associated with process 102, including one or more still images and/or a video stream. For instance, image capturing module 108 may record images of one or more persons participating in process 102, one or more machines, tools, and/or assembly lines associated with process 102, contents of a computer screen associated with process 102, and/or any other persons or objects related to process 102. Image capturing module 108 generates an image/video recording 114, which may include one or more images and/or videos, and which may be stored in storage 110. Image capturing module 108 may include any type of image or video capturing device, including a camera, camcorder, a web cam, or other type of image/video capturing device. In an embodiment, image capturing module 108 may be integrated in a computer to record images and/or video displayed on a display device of the computer.

As shown in FIG. 1, audio recording 114 and image/video recording 116 are stored in storage 110 as a process instance 112. Storage 110 may include one or more of any type of storage mechanism, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

As described above, process 102 may be any suitable type of process, including a manufacturing process or service process. For instance, in an embodiment, process environment 100 may be a manufacturing environment, where process 102 is an assembly line process. In such a situation, process monitoring system 104 may capture a video and/or audio recording of the assembly line process. In another embodiment, process environment 100 may be a service environment, where process 102 is the process of a waiter serving a customer at a restaurant. In such a situation, process monitoring system 104 may capture a video and/or audio recording of the waiter serving the customer at the restaurant.

Another example service environment is a call center environment. Call centers have been used for many years to centralize the process of calling a number of related parties from a centralized physical location, or to handle incoming calls where a large volume of calls is expected. In an embodiment, process environment 100 may be a call center environment. In such an embodiment, process monitoring system 104 may be used to record interactions between a call center agent and a customer. The recording may be analyzed and processed to enable improvements to the services provided by the call center. Although for illustrative purposes, embodiments are frequently described herein in terms of a call center environment, embodiments of the present invention are not limited to call center environments.

Figure 2:
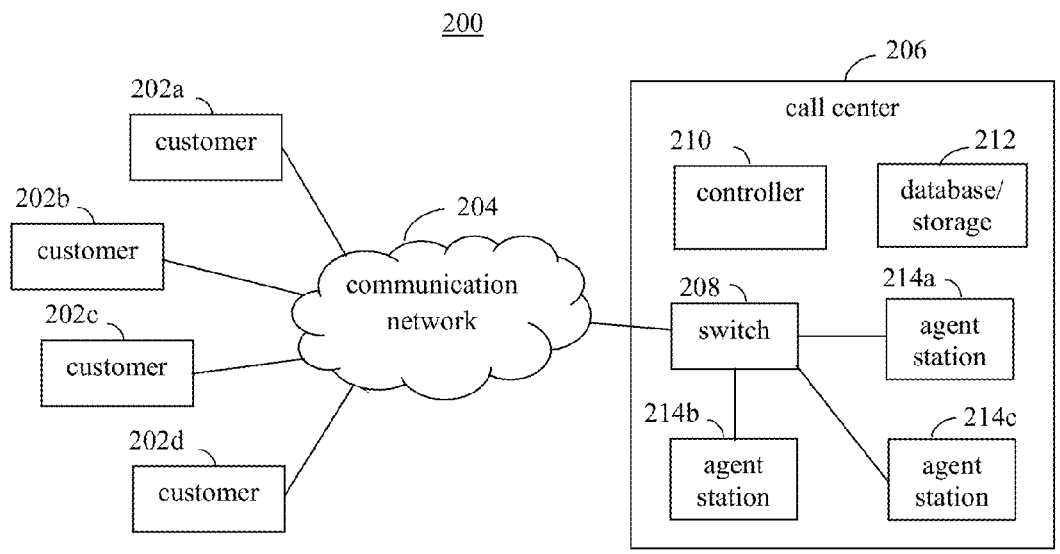
FIG. 2 shows a block diagram of a call center environment, which is an example service environment, according to an embodiment of the present invention.

FIG. 2 shows a block diagram of a call center environment 200, which is an example of process environment 100, according to an embodiment. As shown in FIG. 2, call center environment 200 includes a plurality of customers 202a-202d, a communication network 204, and a call center 206. As shown in FIG. 2, call center 206 includes a plurality of agent stations 214a-214c, a controller 210, and a database/storage 212. Any number of customers 202 and agent stations 214 may be present in call center environment 200. Customers 202 may be customers, actual or potential, of an entity represented by call center 206. As used herein, "customer" refers to actual customers (e.g., persons who are current clients of an entity associated with the call center) and potential customers (e.g., persons that an agent may be soliciting to become a client of the entity associated with the call center). Call center environment 200 is described as follows.

Call center 206 may include a building or other structure for housing agents (not shown in FIG. 2) who work at agent stations 214. Optionally, call center 206 may be a virtual call center in which remote agent stations 214 are connected through a private or public network to switch 208, controller 210, and database/storage 212. As shown in FIG. 2, switch 208 interconnects agent stations 214a-214c and customers 202a-202d through communication network 204. Communication network 204 may include any number of one or more communication networks including a public switched telephone network (PSTN), a cellular network, a data communication network such as the Internet, and/or further communication networks. Each customer 202 has a telephone coupled to communication network 204. In the embodiment of FIG. 2, each agent station 214 includes a telephone connected to switch 208 and a display for use by an agent. In an alternative embodiment, such as a VoIP-based call distribution system (e.g., for a virtual call center and/or computer/telephone integration (CTI)), switch 208 may not be present, and agent stations 214 may be enabled to conduct telephone calls directly over communication network 204.

Controller 210 may be any computer and/or other device(s) having sufficient processing capability and fault tolerance to control switch 208, while communicating with database/storage 212 and agent stations 214a-214c to match inbound and outbound calls with agents. Controller 210 may read a record from database/storage 212 to initiate an outbound call and to present data about a customer 202 to a display at one of agent stations 214a-214c. Any wireless or wired local area network ("LAN") connection or other communication medium may be used to transfer data and commands between agent stations 214a-214c, controller 210, and database/storage 212. Controller 210 may also monitor the progress of calls and manage incoming calls to call center 206.

Agents at agent stations 214a-214c conduct telephone conversations with customers 202a-202c, which may have been initiated by the agents or by customers 202a-202c. The display devices of agent stations 214a-214c may display information to the agents to be used to facilitate the telephone conversations. For example, a display device may display instructions to an agent, may display information about the customer to the agent, may enable the agent to access information related to the customer, etc. The telephone conversations may be conducted to market products or services to the customers 202a-202c (e.g., telemarketing), to provide support to the customer regarding a product or service, and/or for other reasons.

It may be desired for a business associated with call center 206 to improve the quality of the service provided by the agents at agent stations 214a-214c to customers 202a-202d. Interactions with customers can be unpredictable, because customers may make irrational requests, change their minds, make mistakes, and may behave in generally unpredictable ways. Furthermore, because the agents themselves are human, the quality of service provided by agents may vary greatly.

In an embodiment, call center 206 may incorporate process monitoring system 104 to monitor interactions between agents and customers as process 102. For example, each agent station 214 may include an audio capturing module 106 to record conversations between the agent and customer during the telephone calls. The recorded conversation may be stored in database/storage 212 as audio recording 114. Each agent station 214 may additionally or alternatively include an image capturing module 108 to record the content displayed on the display device of the agent station 214 during the telephone calls. The recorded displayed content may be stored in database/storage 212 as image/video recording 116.

Thus, referring to FIG. 1, process monitoring system 104 may be configured to capture process instances associated with a process. The next section describes the annotation of captured process instances with information that may be used to analyze and potentially improve the associated process.

B. Example Process Annotating Embodiments

Figure 3:
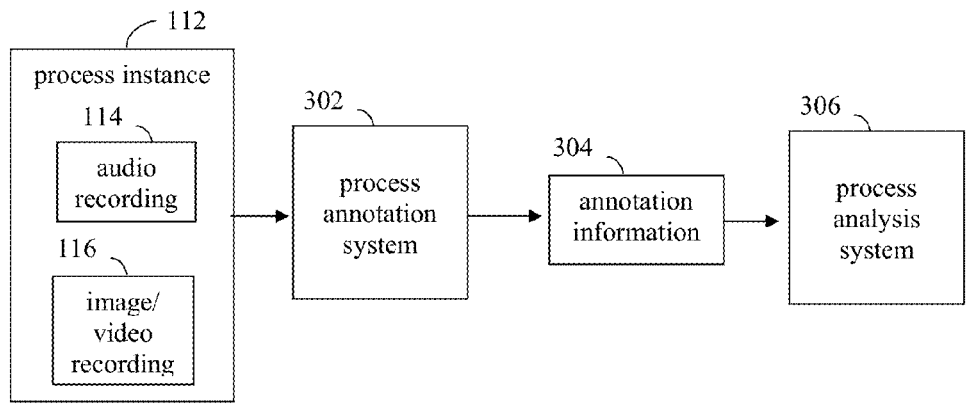
FIG. 3 shows a block diagram of a process analysis environment, according to an example embodiment of the present invention.

Referring to FIG. 1, after generating one or more process instances 112 that include corresponding recordings of process 102, the recordings may be analyzed to enable improvements to process 102. For instance, FIG. 3 shows a block diagram of a process analysis environment 300, according to an example embodiment. As shown in FIG. 3, process analysis environment 300 includes a process annotation system 302 and a process analysis system 306. Process annotation system 302 receives a process instance 112 and generates annotated information 304. Annotated information 304 includes data associated with audio recording 114 and/or image/video recording 116 by process annotation system 302. For example, annotated information 304 may include process step tags, attributes, and/or discovery information, as described in further detail further below. Process analysis system 306 receives annotated information 304 for one or more process instances 112. Process analysis system 306 analyzes the annotated information 304 with regard to the one or more process instances 112 to enable improvements to be made to process 102.

Process annotation system 302 and process analysis system 306 may be implemented in hardware, software, firmware, or any combination thereof, and may include human interaction. For example, process annotation system 302 and/or process analysis system 306 may be implemented as computer code configured to be executed in one or more processors. Alternatively, process annotation system 302 and/or process analysis system 306 may be implemented as hardware logic/electrical circuitry. In an embodiment, process annotation system 302 may include human interaction (e.g., a human interacting with a computer) to annotate process instances 112. For instance, in an embodiment, a human may interact with a user interface of a computer to annotate process instances 112, including by interacting with a keyboard, a mouse, a touch screen, by voice recognition, and/or according to any other user interface mechanism. In another embodiment, the computer may incorporate voice recognition techniques to recognize words/sentences associated with process steps and/or other items of interest in recorded voice of a voice recording, and to automatically generate a searchable transcript, and apply corresponding process step tags, attributes, and/or discovery information to the voice recording. Furthermore, in an embodiment, process analysis system 306 may include human interaction to analyze annotated information 304.

In an embodiment, process annotation system 302 may be configured to automate the collection of an agent's interaction with their computer system(s). For example, in an embodiment, a call center agent may perform work on their computer or workstation to support customer service interactions. The steps the operation takes within their system may be captured and logged by software that notes what button, fields, screens, etc. were interacted with by the agent and when.

Figure 4:
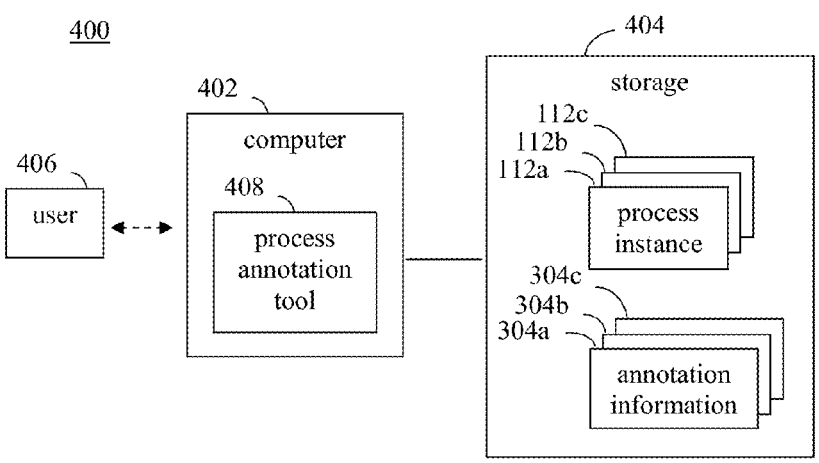
FIGS. 4 and 5 show block diagrams of process annotation systems, according to example embodiments of the present invention.
Figure 5:
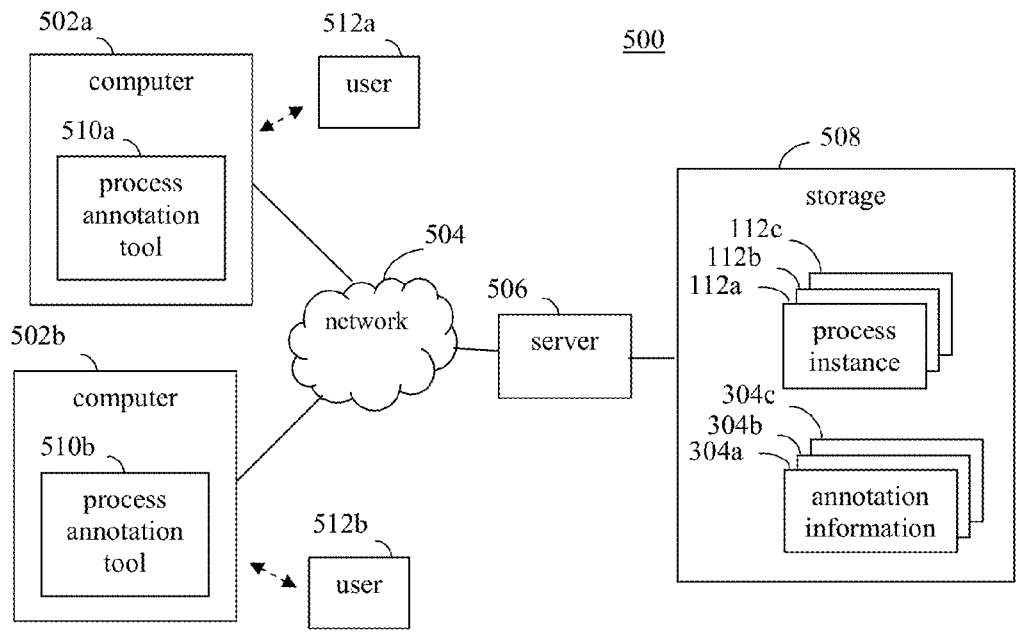

Process annotation system 302 may be configured in various ways. For instance, FIGS. 4 and 5 illustrate example configurations for process annotation system 302 of FIG. 3, which are described as follows. FIG. 4 shows a block diagram of a computer system 400 for implementing process annotation system 302, according to an example embodiment. As shown in FIG. 4, computer system 400 includes a computer 402 and storage 404. Computer 402 includes process annotation tool 408, and storage 404 stores process instances 112a-112c and corresponding generated annotated information 304a-304c. Process annotation tool 408 may be an embodiment of process annotation system 302 of FIG. 3, for example. Any number of process instances 112 may be stored in storage 404. In the example of FIG. 4, a user 406 interacts with process annotation tool 408 at computer 402 to annotate process instances 112a-112c. User 406 may also be referred to as a "scorer," for example. User 406 interacts with process annotation tool 408 to load a process instance 112 from storage 404 and to annotate the loaded process instance 112, to generate corresponding annotated information 304, which is stored in storage 404.

FIG. 5 shows a block diagram of a client-server system 500 for implementing process annotation system 302, according to an example embodiment. As shown in FIG. 5, client-server system 500 includes computers 502a and 502b, a network 504, a server 506, and storage 408. Although two computers 502a and 502b are shown in FIG. 5, any number of computers 502 may be present in client-server system 500. As shown in FIG. 5, computer 502 a includes a process annotation tool 510a, and computer 502b includes a process annotation tool 510b. Storage 508 stores process instances 112a-112c and corresponding annotated information 304a-304c. Any number of process instances 112 may be stored in storage 508. Process annotation tools 510a and 510b and server 506 form an embodiment of process annotation system 302 of FIG. 3.

In the example of FIG. 5, a user 512a interacts with process annotation tool 510a at computer 502a to annotate one or more of process instances 112a-112c, and a user 512b interacts with process annotation tool 510b at computer 502b to annotate one or more of process instances 112a-112c. Typically, users 512a and 512b are not enabled to annotate the same process instance 112 at the same time (e.g., due to a process instance "locking" mechanism). Users 512a and 512b interact with process annotation tools 510a and 510b, respectively, to communicate with server 506 through network 504 to retrieve a process instance 112 from storage 508 and to annotate the retrieved process instance 112, to generate corresponding annotated information 304. A computer 502 may maintain a constant connection with server 506 when annotating a process instance 112, or may receive a process instance 112, disconnect from server 506, annotate the received process instance 112, and reconnect with server 506 to supply annotated information 304 for the received process instance 112. The generated annotated information 304 is transmitted through network 504 to server 506, which stores the generated annotated information 304 in storage 508. Network 504 may be any type of network, including a local area network (LAN), a wide area network (WAN), or a combination of networks, such as the Internet.

Thus, as shown in FIG. 4, locally stored process instances 112 may be accessed by process annotation tool 408 for processing. As shown in FIG. 5, process instances 112 may be accessed by process annotation tool 510 at a remote database through a network to be processed. In still another embodiment, process annotation system 302 may be located at server 506, and may be accessed by users 512 interacting with a Web browser or other application at computers 502. Process annotation system 302 may be configured in further ways, as would be apparent to persons skilled in the relevant art(s) from the teachings herein. Process annotation tools 408 and 510 may be configured in various ways, including as computer applications implemented as computer code that run in computers 402 and 502, respectively.

Figure 6:
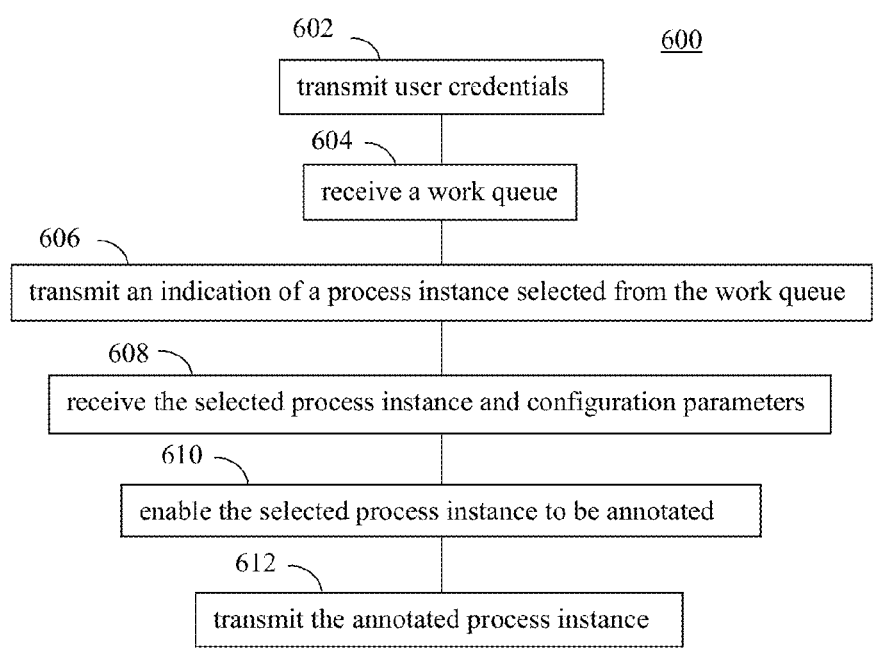
FIG. 6 shows a flowchart for annotating a process instance in a client-server computer system, according to an example embodiment of the present invention.

Referring to FIG. 5, a process annotation session between server 506 and computers 502 may be performed in a variety of ways. For instance, FIG. 6 shows a flowchart 600 for annotating a process instance in a client-server system, according to an example embodiment. Client-server system 500 shown in FIG. 5 may operate according to flowchart 600, for example. Further structural and operational embodiments will be apparent to persons skilled in the relevant art(s) based on the discussion regarding flowchart 600. Flowchart 600 is described as follows with respect to FIG. 7, which shows a block diagram of client-server system 500 of FIG. 5 (computer 502b is not shown in FIG. 7 for ease of illustration). Although illustrated below with respect to computer 502a, each computer 502 present in client-server system 500 may function as described as follows.

Figure 7:
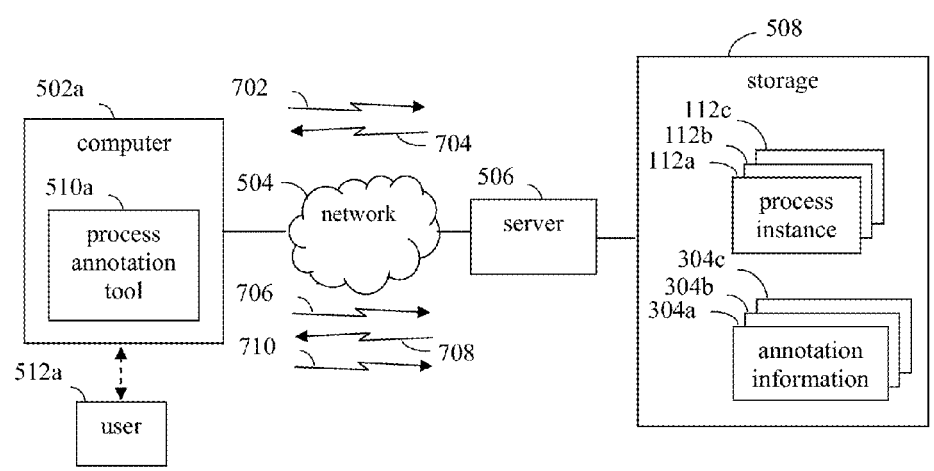
FIG. 7 shows a block diagram of a client-server computer system, according to an example embodiment of the present invention.

Flowchart 600 begins with step 602. In step 602, user credentials are transmitted. In an embodiment, user 512 a may log into process annotation tool 510a at computer 502a to be enabled to access process instances 112 for annotation. For instance, user 512a may enter a login id and a password, and/or other user credentials. As shown in FIG. 7, computer 502a generates and transmits a first communication signal 702. First communication signal 702 includes the user credentials of user 512a. First communication signal 702 is transmitted through network 504 to server 506.

In step 604, a work queue is received. In an embodiment, server 506 receives first communication signal 702. Server 506 analyzes the user credentials received in first communication signal 702 to determine whether they are sufficient to enable user 512a to have access to process instances 112 in storage 508. If server 506 determines that the user credentials are sufficient (e.g., user 512 a is validated), server 506 generates and transmits a second communication signal 704. Second communication signal 704 includes a work queue indicating a list of process instances 112 (e.g., process instances 112a-112c) that are available to be annotated. Second communication signal 704 is transmitted through network 504 to computer 502a. Note that server 506 may determine and/or assign a role to user 512 a based on the received user credentials, such as a scorer, a quality assurance role, or other role. Note that in an embodiment, the work queue provided by server 506 may be filtered (e.g., particular process instances may be excluded) based on how an "administrator" configures a particular study and assigns process instances to users 512.

In step 606, an indication of a process instance selected from the work queue is transmitted. In an embodiment, computer 502a receives second communication signal 704. Process annotation tool 510a receives the work queue from second communication signal 704, and provides the work queue to user 512a. User 512a interacts with process annotation tool 510a to select a process instance 112 provided in the work queue for annotation.

Figure 8:
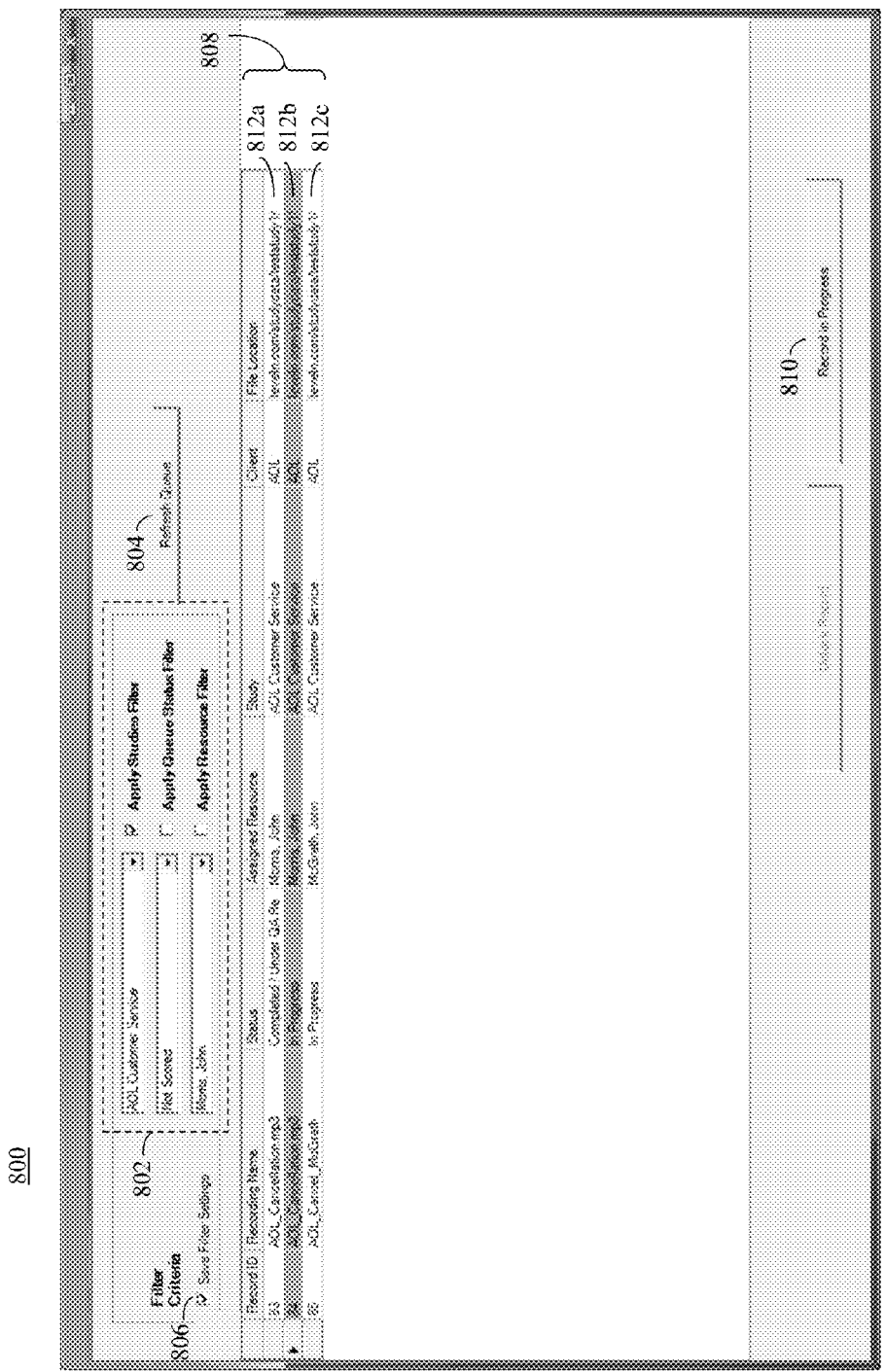
FIG. 8 shows a graphical user interface (GUI) that provides a work queue, according to an example embodiment of the present invention.

Process annotation tool 510a may provide the work queue to user 512a in any fashion, including displaying the work queue to user 512a in a user interface. For example, FIG. 8 shows a graphical user interface (GUI) 800, according to an embodiment. GUI 800 may be a graphical window, a web page displayed by a browser, or other type of GUI. As shown in FIG. 8, GUI 800 includes a queue filter interface 802, a refresh queue interface element 804, a save filter settings interface element 806, a work queue interface 808, and an action interface element 810. These interfaces and elements of GUI 800 are described as follows.

Work queue interface 808 displays a list of process instances 812a-812c. Although three process instances 812a-812c are shown in work queue interface 808 in FIG. 8 for illustrative purposes, any number of process instances 812 may be included in work queue interface 808. The list of process instances 812a-812c may be received in second communication signal 704 from server 506 as the work queue. Each process instance 812 may be identified in work queue interface 808 in various ways. For instance, in the example of FIG. 8, work queue interface 808 displays a table that lists process instances by row, and has respective columns for a record ID, a recording name, a status, an assigned resource, a study, a client, and a file location for each process instance 812. The record ID column indicates a numeric (or alphanumeric) value representative of the corresponding process instance 812. The recording name column indicates a name (e.g., in alphanumeric form) of a recording (e.g., audio and/or video) included in each process instance 812. The status column indicates an annotation status for each process instance 812, including status values such as "ready" (e.g., ready and available for annotation), "in progress," or "completed." The assigned resource column indicates a person assigned to annotate each process instance 812. The study column indicates a project name in which each process instance 812 is included. The client column indicates a client name for each process instance 812. The file location column indicates a location (e.g., a directory location in storage) for each process instance 812. Note that fewer, further, and/or alternative columns providing information for process instances may be displayed in work queue interface 808, in embodiments.

Work queue interface 808 enables one of the displayed process instances 812a-812c to be selected for annotation by the user. For example, in an embodiment, the user may click on a process instance 812 using a pointer, may use a keyboard, or may use any other suitable technique to select a process instance 812.

Queue filter interface 802 enables a user to filter the list of process instances 812 displayed in work queue interface 808. Queue filter interface 802 may include any number and type of interface elements to configure the filtering. For instance, in the example of FIG. 8, queue filter interface 802 includes a first pull down menu configured to enable a study to be selected from a list of studies, a second pull down menu configured to enable a scored status (e.g., scored, not scored) to be selected from a list, and a third pull down menu configured to enable an name to be selected from a list of assigned resource names. The list of process instances 812 displayed in work queue interface 808 may be filtered based on study, scored status, and/or assigned resource, respectively, according to the first, second, and third pull down menus. In the example of FIG. 8, queue filter interface 802 further includes an apply studies filter checkbox, an apply queue status filter checkbox, and an apply resources filter checkbox. Depending on whether they are checked or not, the first, second, and third checkboxes respectively enable filtering based on the first-third pull down menus.

Refresh queue interface element 804 may have the form of any type of GUI element, including a button (as shown in FIG. 8) or other interface element. By interacting with (e.g., clicking on) refresh queue interface element 804, a user is enabled to refresh the list of process instances 812 displayed in work queue interface 808. The user may desire to refresh the list because the status of process instances 812 stored at storage 508 may be constantly changing, as each process instance 812 may be selected for annotation at any time by others of users 512. If a process instance 812 is indicated in the list of process instances 812 displayed in work queue interface 808 as "in progress" or "completed," the user will know not to select the process instance 812. If the process instance 812 is indicated in the list as "ready," the user will know that the process instance 812 may be selected for annotation. The user may interact with refresh queue interface element 804 to update this status information. In another embodiment, the list of process instances 812 displayed in work queue interface 808 may be refreshed automatically (e.g., on a periodic basis), and refresh queue interface element 804 may not be present.

Save filter settings interface element 806 may have the form of any type of GUI element, including a checkbox (as shown in FIG. 8) or other interface element.

By interacting with (e.g., checking) save filter settings interface element 806, a user is enabled to save the filter criteria configured in queue filter interface 802, such that a next time the user interacts with GUI 800, queue filter interface 802 will have the same settings as in the current session. This may enable a user to more quickly begin work a next time the user interacts with GUI 800, because the user will not need to configure the filter settings.

Action interface element 810 may have the form of any type of GUI element, including a button (as shown in FIG. 8) or other interface element. By interacting with (e.g., clicking on) action interface element 810, a user is enabled to transmit a selection of a process instance 812 currently selected in work queue interface 808 to server 506, to request the process instance 812 for annotation. Alternatively, in an embodiment, the user may double click on the desired process instance 812 listed in work queue interface 808 to request the process instance 812 for annotation.

As shown in FIG. 7, computer 502a generates and transmits a third communication signal 706. Third communication signal 706 indicates a request for the process instance 112 selected by user 512a from the work queue. Third communication signal 706 is transmitted through network 504 to server 506.

Referring back to FIG. 6, in step 608, the selected process instance and configuration parameters are received. In an embodiment, server 506 receives third communication signal 706. Server 506 is configured to retrieve the selected process instance 112 indicated in third communication signal 706 from storage 508. For instance, in an embodiment, server 506 may be configured to determine whether the selected process instance 112 is already in use (e.g., locked) by another user (e.g., user 512b). If the selected process instance 112 is already in use, server 506 may transmit an indication to computer 502a that the request is rejected. If the selected process instance 112 is not already in use, server 506 may assign the selected process instance 112 to user 512a, and may lock the selected process instance 112 from access by other users. Server 506 generates and transmits a fourth communication signal 708. Fourth communication signal 708 includes the selected process instance 112, and is received by computer 502a. Furthermore, fourth communication signal 708 may include configuration parameters used to enable the selected process instance 112 to be annotated. Examples of such configuration parameters include process step tags, attributes, and discovery information. These configuration parameters are described in further detail elsewhere herein. Fourth communication signal 708 is transmitted through network 504 to computer 502a.

Note that in an embodiment, if the selected process instance 112 had been previously annotated and is re-selected for annotation (e.g., user 512a had previously partially or completely annotated process instance 112a, and user 512a or another user re-selects process instance 112a), any configuration parameters that were previously applied, such as process step tags, attributes, and discovery information, may be provided with the selected process instance 112 in fourth communication signal 708.

In step 610, the selected process instance is enabled to be annotated. Process annotation tool 510a receives the selected process instance 112 and configuration parameters included in fourth communication signal 708. Process annotation tool 510a enables user 512a to annotate the selected process instance 112 according to the received configuration parameters, to generate annotated information 304. Annotated information 304 may include various data, including process step tags applied to audio and/or image/video recordings 114 and 116 of the selected process instance 112, any attribute values applied to selected process instance 112, and/or any new discoveries applied to selected process instance 112.

In step 612, the annotated process instance is transmitted. As shown in FIG. 7, computer 502a generates and transmits a fifth communication signal 710. Fifth communication signal 710 includes annotated information 304 generated by user 512a for the selected process instance 112. Fifth communication signal 710 is transmitted through network 504 to server 506. Server 506 receives fifth communication signal 710, and stores the annotated information 304 received in fifth communication signal 710 in storage 508. For instance, if the selected process instance 112 was process instance 112b, the received annotated information 304 may be stored in storage 508 as annotated information 304b. Note that in an embodiment, any discovery information that was applied to selected process instance 112 by user 512a may be made available to other users of process annotation system 302 (as further described below).

Process annotation tools 402 (FIG. 4), 510 (FIG. 5), server 506 (FIG. 5), and/or flowchart 600 (FIG. 6) may be implemented in hardware, software, firmware, or any combination thereof. For example, process annotation tools 402, 510, server 506, and/or flowchart 600 may be implemented as computer code configured to be executed in one or more processors. Alternatively, process annotation tools 402, 510, server 506, and/or flowchart 600 may be implemented as hardware logic/electrical circuitry.

Figure 9:
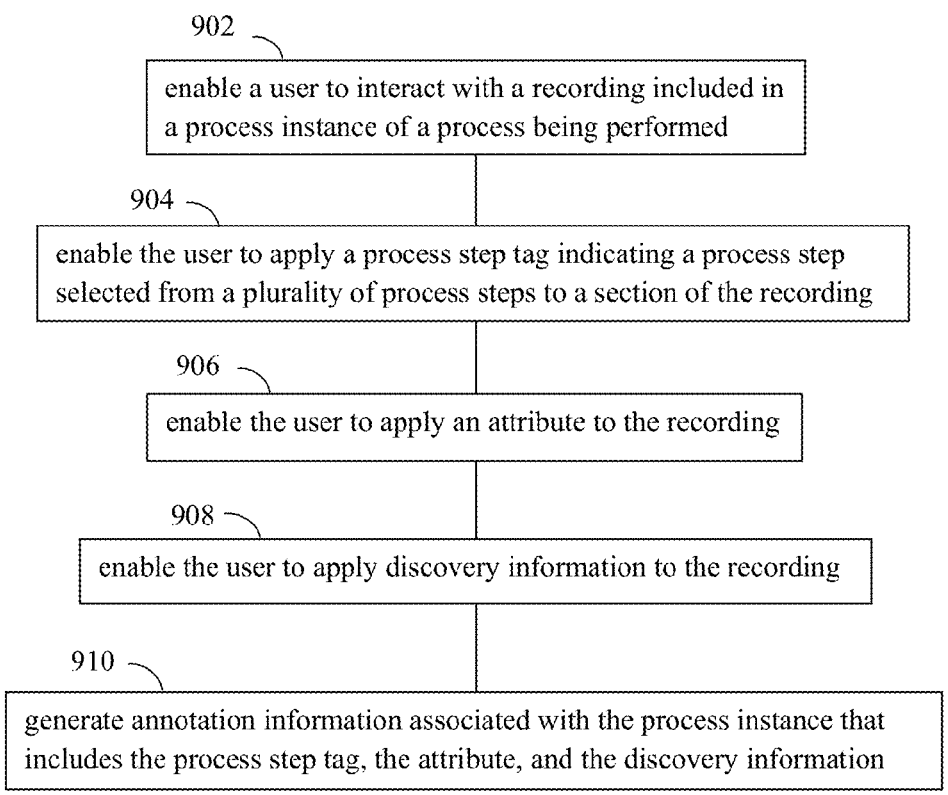
FIG. 9 shows a flowchart for annotating a process instance, according to an example embodiment of the present invention.
Figure 10:
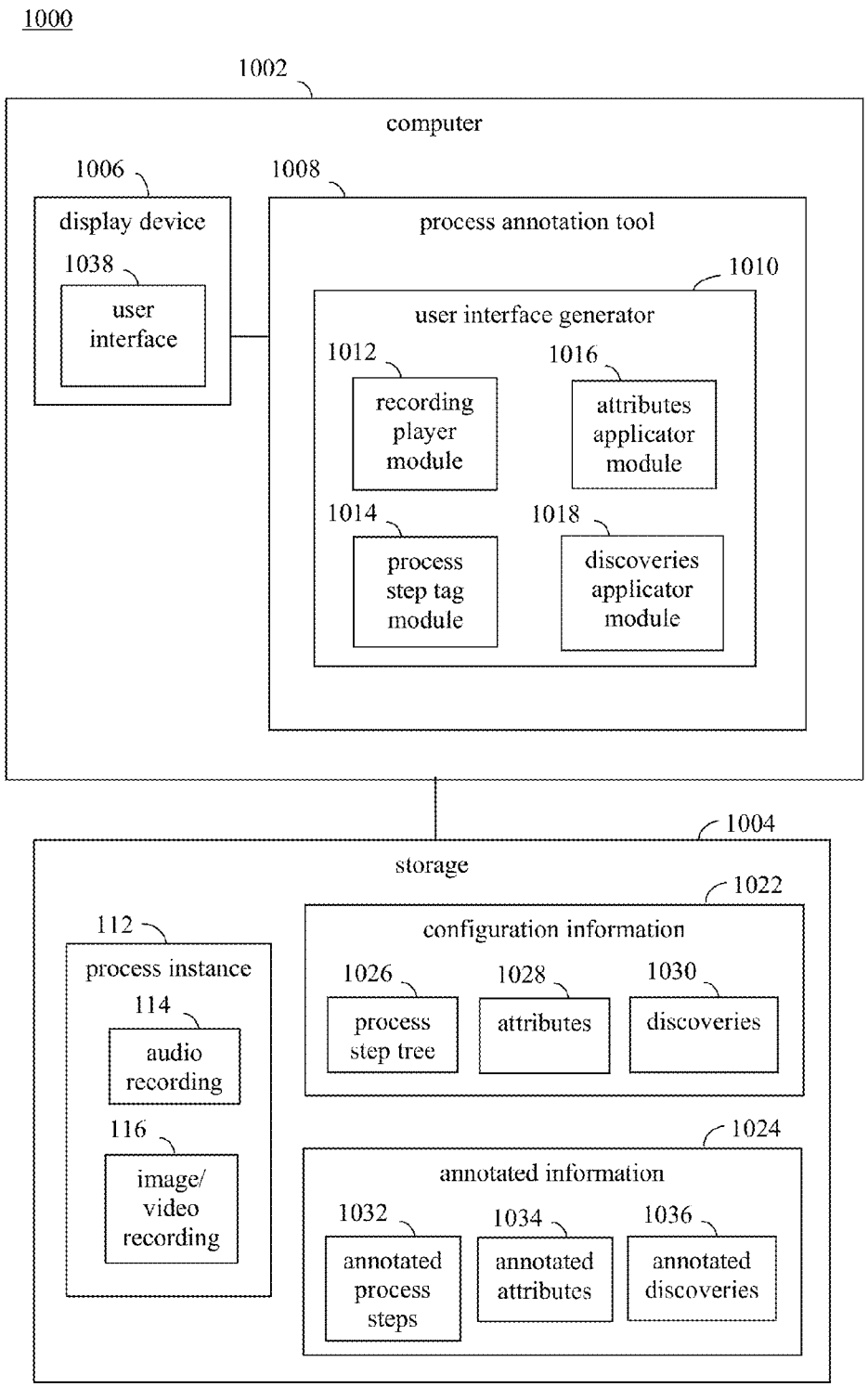
FIG. 10 shows a block diagram of a computer system configured to annotate process instances, according to an example embodiment of the present invention.

As described above, in step 610 of flowchart 600, the selected process instance is enabled to be annotated. The annotation of a process instance may be performed in various ways. For example, FIG. 9 shows a flowchart 900 for annotating a process instance, according to an example embodiment. Computer system 400 shown in FIG. 4 and client-server system 500 shown in FIG. 5 may operate according to flowchart 900, for example. Further structural and operational embodiments will be apparent to persons skilled in the relevant art(s) based on the discussion regarding flowchart 900. The steps of flowchart 900 may occur in orders other than the order shown in FIG. 9, in embodiments. Flowchart 900 is described as follows with respect to FIG. 10, for illustrative purposes. FIG. 10 shows a block diagram of a computer system 1000 configured to annotate process instances, according to an example embodiment. As shown in FIG. 10, computer system 1000 includes a computer 1002 and storage 1004. Computer 1002 includes a display device 1006 and a process annotation tool 1008. Process annotation tool 1008 is an example of process annotation system 302 shown in FIG. 3. Computer 402 of FIG. 4 and/or computers 512a and 512b of FIG. 5 may be implemented as computer 1002, in an embodiment.

Flowchart 900 begins with step 902. In step 902, a user is enabled to interact with a recording included in a process instance of process being performed. For example, as shown in FIG. 10, process instance 112 is stored in storage 1004. Process instance 112 may have been retrieved by process annotation tool 1008 from server 506 (FIG. 5) during step 608 of flowchart 600 (FIG. 6), for instance, and stored by computer 1002 in storage 1004. Process annotation tool 1008 may enable a user to interact with audio recording 114 and/or image/video recording 116. Audio recording 114 and/or image/video recording 116 may be recordings of a first person, such as a company representative or agent, interacting with a second person (e.g., which may be a customer, actual or potential) and/or a machine, or may be recordings of one or more machines performing a process.

As shown in FIG. 10, process annotation tool 1010 includes a user interface generator 1010. User interface generator 1010 is configured to generate a user interface 1038 at display device 1006. User interface 1038 is configured to enable a user of computer 1002 to interact with process annotation tool 1008, including enabling the user to annotate process instance 112. As shown in FIG. 10, user interface generator 1010 includes a recording player module 1012, a process step tag module 1014, an attributes applicator module 1016, and a discoveries applicator module 1018. These modules of user interface generator 1010 are each configured to generate a respective portion of user interface 1038.

Figure 11:
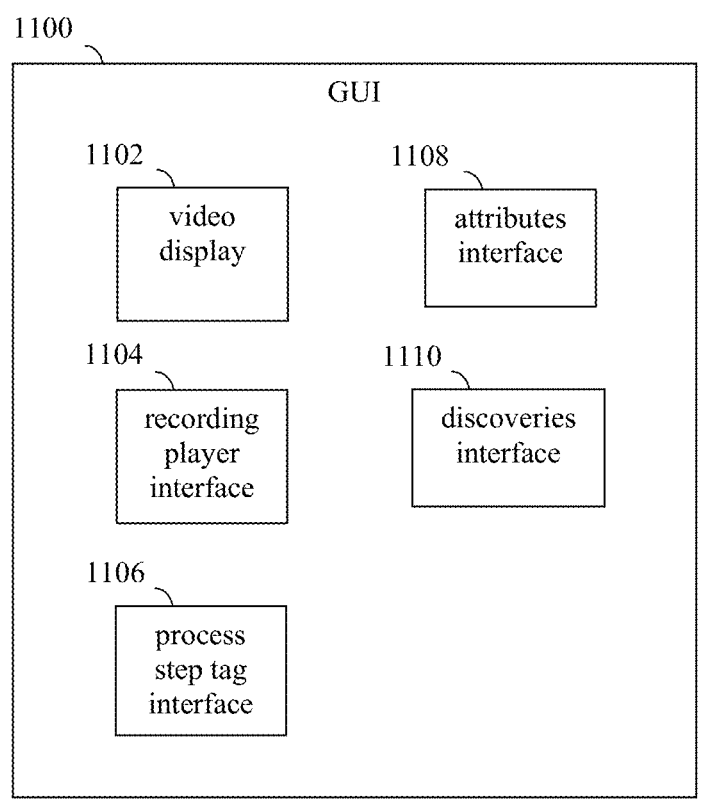
FIG. 11 shows a block diagram of a GUI, according to an example embodiment.

For instance, FIG. 11 shows a block diagram of a graphical user interface (GUI) 1100, according to an example embodiment. GUI 1100 is an example of user interface 1038 shown in FIG. 10. As shown in FIG. 11, GUI 1100 includes a video display 1102, a recording player interface 1104, a process step tag interface 1106, an attributes interface 1108, and a discoveries interface 1110. Recording player module 1012 is configured to generate video display 1102 and recording player interface 1104. Video display 1102 is configured to display images/video of image/video recording 116. Recording player interface 1104 is configured to enable the user to control playback (e.g., play, pause, fast forward, reverse, etc.) of image/video recording 116 displayed in video display 1102 and/or audio recording 114 being played to the user (e.g., through speakers, a headset, etc., of computer 1002). Note that in an embodiment, image/video recording 116 may include recorded audio. When playing audio recording 114 (e.g., an audio-only recording), recording player interface 1104 may control audio recording playback while nothing or some other graphical representation (e.g., sound wave line, a speaker stress level, etc.) is displayed in video display 1102. In an example embodiment, recording player interface 1104 may be an interface for a mini Windows Media Player (WMP) or other commercially available (or special purpose) media player embedded in process annotation tool 1008.

Process step tag module 1014 is configured to generate process step tag interface 1106. Process step tag interface 1106 is configured to enable the user to apply process step tags to process instance 112 based on the playing of image/video recording 116 and/or audio recording 114. Attributes applicator module 1016 is configured to generate attributes interface 1108. Attributes interface 1108 is configured to enable the user to apply attributes to process instance 112 based on the playing of image/video recording 116 and/or audio recording 114. Discoveries applicator module 1018 is configured to generate discoveries interface 1110. Discoveries interface 1110 is configured to enable the user to associate discovery information with process instance 112 based on the playing of image/video recording 116 and/or audio recording 114. Examples of each of these modules and interfaces of user interface generator 1010 and GUI 1100 are described in further detail below.

In step 904, the user is enabled to apply a process step tag indicating a process step selected from a plurality of process steps to a section of the recording. For example, in an embodiment, process step tag interface 1106 may be configured to enable the user to apply process step tags to a recording (e.g., image/video recording 116 and/or audio recording 114, depending on whether one or both are included in process instance 112). A process step tag is a descriptive label for a particular process step captured by the recording. A user determines what particular process step is being performed during a section of the recording by viewing/listening to the section of the recording, and is enabled by process step tag interface 1106 to apply a process step tag to the section of the recording that is descriptive of the determined process step.

Figure 12:
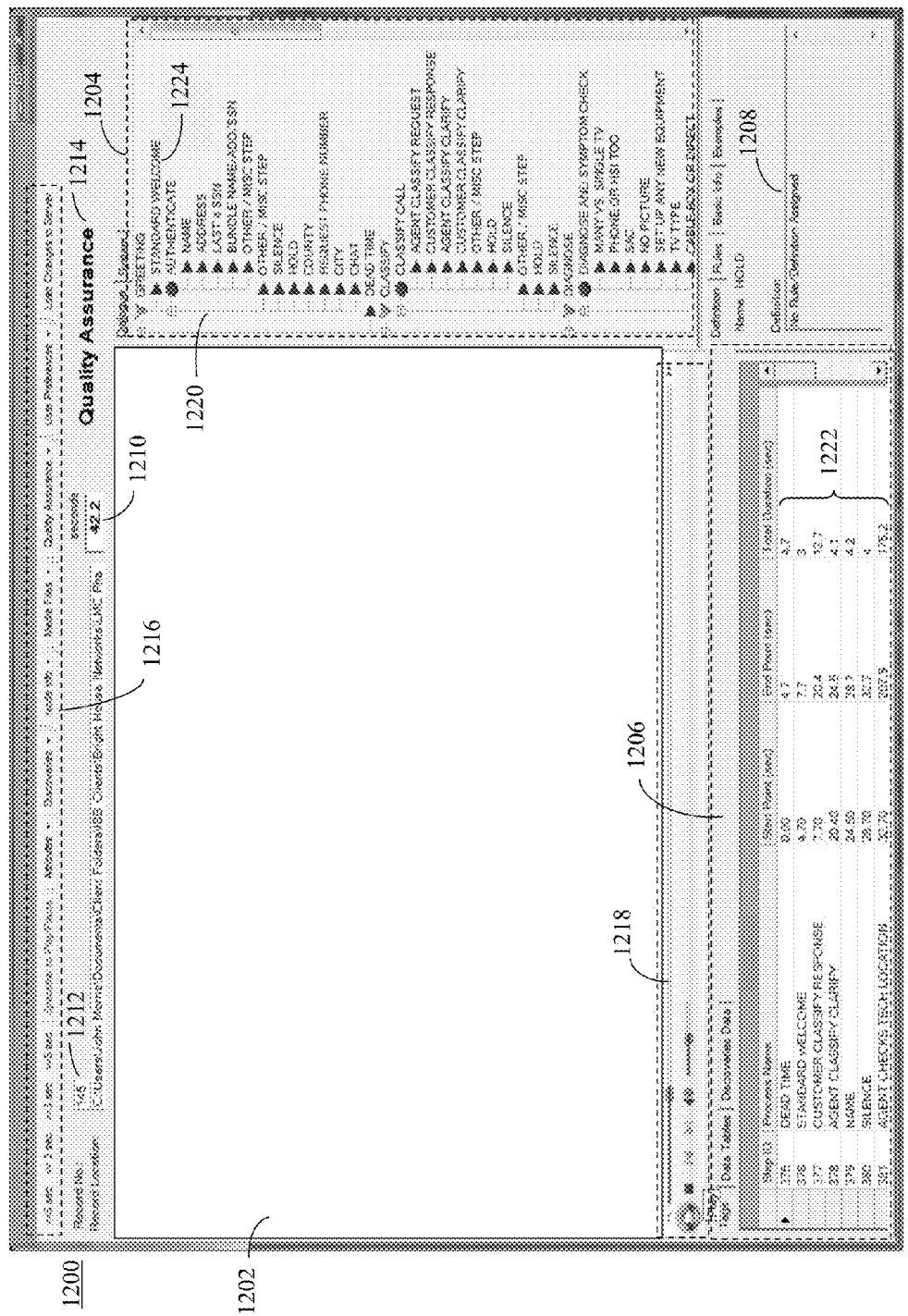
FIGS. 12 and 14-16 shows example GUIs generated for annotating process instances, according to embodiments of the present invention.

GUI 1100, including process step tag interface 1106, may be configured in various ways to perform step 904. For example, FIG. 12 shows a GUI 1200 generated by user interface generator 1010 shown in FIG. 10, according to an embodiment. GUI 1200 may be a graphical window, a web page displayed by a browser, or other type of GUI, and is an example of GUI 1100 shown in FIG. 11. As shown in FIG. 12, GUI 1200 includes a video display interface 1202, a process step tag interface 1204, a tagged process step indicator interface 1206, a process step detail interface 1208, a current recording duration indicator 1210, a process instance detail interface 1212, a current workflow task indicator 1214, a menu interface 1216, and a recording player interface 1218. These interfaces and indicators of GUI 1200 are described as follows.

Figure 13:
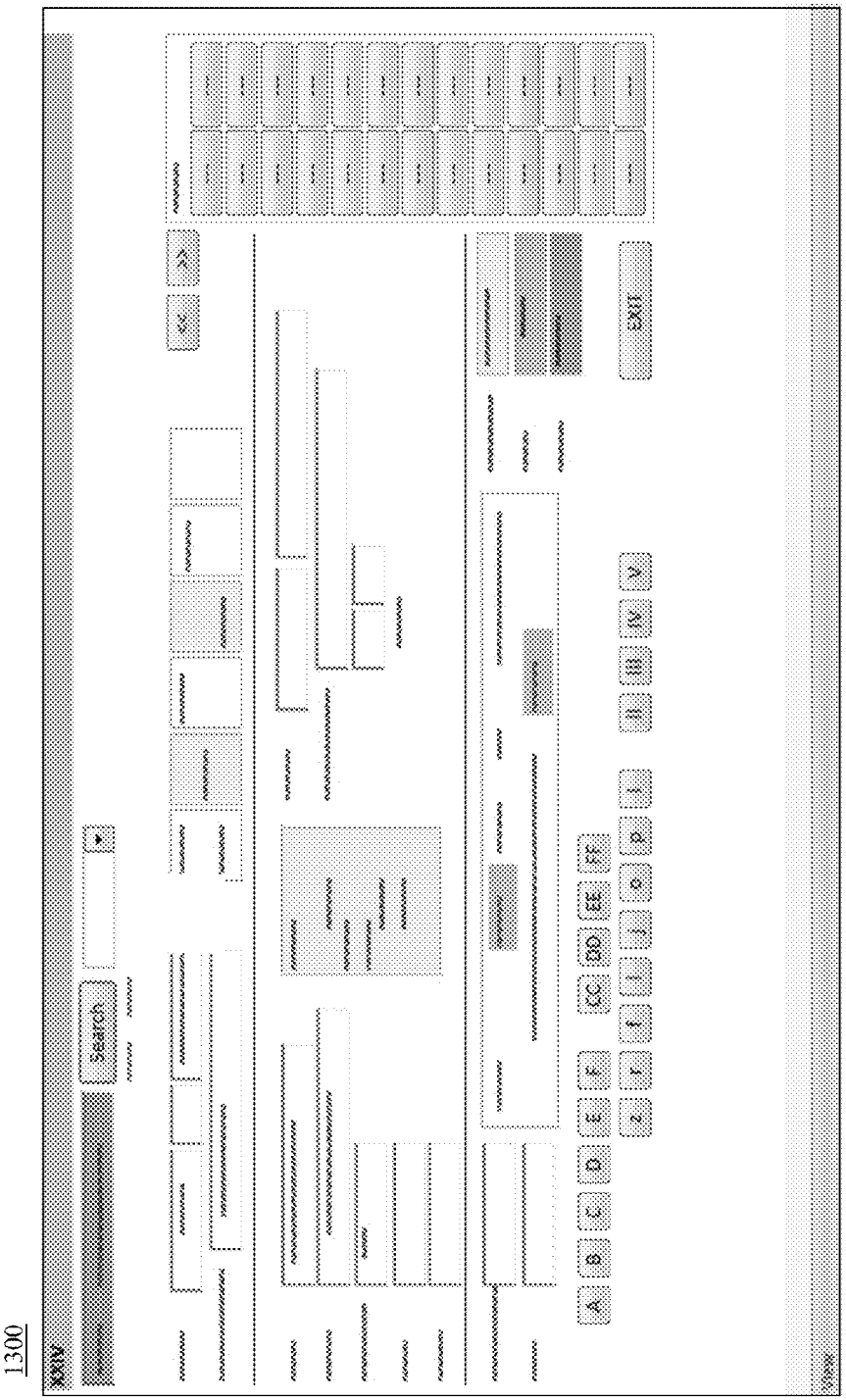
FIG. 13 shows a view of an example call center application displayed on a display device.

Video display interface 1202 is a portion of GUI 1200 in which images and/or video, such as image/video recording 116, may be displayed. For instance, image/video recording 116 may include images and/or video captured of the performance of process 102 (FIG. 1), as described above. For example, image/video recording 116 may include images and/or video captured of the performance of a manufacturing process or a service process, including a screen capture of a computer screen of a telemarketer or customer service representative interacting with a customer, such as described above with respect to FIG. 2. Note that only audio was captured of the process, video display interface 1202 may display nothing (e.g., may be blank) or may display some other graphical representation. For illustrative purposes, FIG. 13 shows a screen shot 1300, which is a screen capture of an application displayed in the call center agent's computer display while the call center agent is interacting with a customer. Screen shot 1300 may be a standalone image, or may be an image included in a stream of images in a video stream. Screen shot 1300 may be included in image/video recording 116, capturing during the agent-customer interaction, and may be displayed in video display interface 1202 during a subsequent playback during an annotation session. Call center applications, such as shown in the example of FIG. 13, may have any configuration, including displaying customer account, identification, and contact information, script information for the agent, etc., and may enable the call center agent to enter information regarding the customer and/or to perform other functions, depending on the particular application.

Recording player interface 1218 is an example of recording player interface 1104 (FIG. 11), and is configured to enable the user to control playback (e.g., play, pause, fast forward, reverse, etc.) of image/video recording 116 displayed in video display 1102 and/or audio recording 114.

Current recording duration indicator 1210 is configured to indicate a current point in time (e.g., an elapsed time) for the current recording (e.g., audio recording 114 or image/video recording 116). Current recording duration indicator 1210 may indicate the current point in time in terms of hours, minutes, seconds, etc.

Menu interface 1216 may be configured in any manner to indicate any number of menu options for the current session of the process annotation tool. For instance, in the example of FIG. 12, menu interface 1216 has the configuration of a menu bar at the top of GUI 1200, and includes several menu sections, including recording playback options (e.g., "<<5 sec," "<<3 sec," ">>3 sec," ">>5 sec," "Spacebar to Play/Pause"), an attributes menu, a discoveries menu, a node information menu, a media files menu, a quality assurance menu, a user preferences menu, and a "load changes to server" button.

Current workflow task indicator 1214 is configured to indicate the current task being performed for the current session of the process annotation tool within a currently defined workflow. For instance, current workflow task indicator 1214 may indicate current workflow tasks such as initial scoring/mark-up, quality assurance, etc.

Process step tag interface 1204 is an example of process step tag interface 1106 shown in FIG. 11. Process step tag interface 1204 is configured to enable a user to apply process step tags to various sections of the current recording (audio and/or video recording 114 and 116) that are descriptive of the process step occurring during the section of the recording. For example, as shown in FIG. 12, process step tag interface 1204 displays a process tree 1220. Process tree 1220 is a hierarchical tree of process steps that are predetermined to potentially be performed during the process (e.g. process 102 of FIG. 1) captured in the current recording of the current process instance 112. For example, during a configuration phase for process annotation system 302 (described in further detail below), the process captured by process instance 112 may be decomposed into a plurality of process steps that may be performed during the process. Each process step may be assigned a label, which is included in a process tree 1220 formed for the process. When a process instance 112 is requested for annotation (e.g., in step 606 of FIG. 6, from server 506), process tree 1220 may be received in configuration information transmitted with the process instance 112 (e.g., in step 608 of FIG. 6). For instance, FIG. 10 shows configuration information 1022 in storage 1004, which may be received with process instance 112. As shown in FIG. 10, configuration information includes a process step tree 1026.

During annotation of the process instance 112, process steps may be selected from process tree 1220 and assigned (tagged) to sections of the recording(s) associated with the process instance 112, to identify the process steps actually performed during the process. Process instance 112 may be subsequently analyzed according to the process steps identified to have occurred therein to determine a quality of the captured process. Examples of such analysis are described in further detail in the next subsection further below.

FIG. 10 shows annotated information 1024 in storage 1004, which includes annotated information associated with process instance 112. Information regarding the process steps tags assigned by the user to sections of the recording by interacting with process step tag interface 1106 may be output from process step tag module 1014 and stored in storage 1004 as annotated process steps 1032. Annotated process steps 1032 are included in annotated information 1024 in storage 1004.

Referring to the example of FIG. 12, process tree 1220 includes three process step categories of "Greeting," "Classify," and "Diagnose", and includes a process step of "Dead time." The process step category of "Greeting" includes the process steps of "Standard welcome," "Other/misc step," "Silence," "Hold," "County," "Request phone number," "City," and "Chat," and further includes a subcategory of "Authenticate." The subcategory of "Authenticate" includes the process steps of "Name," "Address," "Last 4 SSN," "Bundle Name/Add/SSN," and "Other/misc step." The process step category of "Classify" includes the process steps of "Other/misc step," "Hold," and "Silence," and further includes a subcategory of "Classify call." The "Classify call" subcategory includes the process steps of "Agent classify request," "Customer classify response," "Agent classify clarify," "Customer classify clarify," "Other/misc step," "Hold," and "Silence." The process step category of "Diagnose" includes the subcategory of "Diagnose and symptom check." The "Diagnose and symptom check" subcategory includes the process steps of "Many vs. single TV," "Phone or HIS too," "SAC," "No picture," "Set up any new equipment," "TV type." Further subcategories and/or process steps for the category of "Diagnose," and further process steps and categories for process tree 1220 may be present but not visible in FIG. 12, but may be accessed by interacting with a scroll bar of process step tag interface 1204. Any of the process steps shown in process tree 1220 may be selected to be assigned to sections of a recording being played in GUI 1200.

Although not shown in FIG. 12, process tree 1220 may include one or more process step "wild card" that may be assigned (tagged) to sections of the recording(s) associated with the process instance 112. There may be cases when study preparation for building process tree 1220 (for audio and/or video) does not capture all the process steps desired to be tagged. As in FIG. 12, process tree 1220 may include an "other" process step as a catch-all process step. However, there may be cases where a scorer desires to add and define a process step "on the fly." This may occur when a process step repeatedly shows up during annotation of process instances included in a study. Including such a process step into the "other" process step may obscure potentially important data for analysis and for discoveries. A process step wild card enables the scorer to build a process step on the fly when there isn't an adequate option already present in the predefined list of process steps included in process tree 1220. The user may define a wild card process step in an interface in page 1200 (not shown in FIG. 12), by entering a label for the process step into the interface. The new wild card process step, when added by a scorer, may be made available to other scorers (e.g., in annotated process steps 1032 included in annotation information 1024, which is returned to server 506) to allow scorer to tag process instances that they are scoring with the new wild card process step (e.g., the wild card process step would subsequently show up in process tree 1220, as defined)

Calibration activities (described in further detail below) may review any added wild card process steps, their definition, and their application to process instances. A determination would be made as to whether to formally add the wild card process step to process tree 1220. As the wild card process step was, by definition, initially excluded from process tree 1220, some rework may be optionally performed for process instances scored before the wild card process step was added. If it is desired to control/limit a proliferation of wild card process steps, the ability to add a wild card process step may be limited to a subset of experienced scorers.

Tagged process step indicator interface 1206 includes an example list 1222 of process step tags that were selected by a user from process tree 1220 to be assigned to sections of an audio and/or video recording (e.g., a video recording played in video display interface 1202). For instance, in the example of FIG. 12, list 1222 displays a table that lists process steps by row, and having respective columns for a step ID, a process name, a start point (e.g., in seconds), an end point (e.g., in seconds), and a total duration (e.g., in seconds). Each process step listed in list 1222 has corresponding data displayed in each column. The step ID column indicates a numeric (or alphanumeric) value representative of the corresponding process step. The process name column indicates a name (e.g., in alphanumeric form) of the process step indicated in process tree 1220. The start point column indicates a time (e.g., relative to a starting time of zero for the recording) at which the process step was indicated by the user as starting. The end point column indicates a time (e.g., relative to a starting time of zero for the recording) at which the process step was indicated by the user as ending. The total duration column indicates a length of time for the process step from the starting time to the ending time.

The user may select (e.g., click on, drag and drop, double click, etc.) a process step in process tree 1220 to assign the process step as a tag to a current section of the recording being played, so that the process step is indicated in list 1222 of tagged process step indicator interface 1206. For example, process step 1224 of process tree 1220, which is "Standard welcome," may have been selected by the user to assign process step 1224 to a section of the recording being played. As shown in FIG. 12, process step 1224 is indicated in a second row of list 1222, as being assigned to a section of the recording from 4.7 seconds to 7.7 seconds of the recording.

In an embodiment, to tag a section of a recording with a process step, the user may select the process step in process tree 1220 at the starting time of the section while the recording is playing to indicate the start point, and may select the process step again in process tree 1220 at the ending time of the section while the recording is playing to indicate the end point. In another embodiment, the user may select a process step in process tree 1220 at the ending time of the section while the recording is playing to indicate the ending point of the section, while the starting time is automatically indicated for the section as the ending time indicated for the previous section. In either embodiment, there is no need for a timer that tracks the passage of time, as the length of time of a process step may be calculated by subtracting the starting time from the ending time. In further embodiments, sections may be tagged with process steps in alternative ways.

For instance, in an embodiment, when the annotation of a record is first initiated, a start tag having a value of 00.0 seconds may be inserted into the record. A next process step annotated will use the start tag (with its value of 00.0 seconds) and for the value of the end tag the current position value is provided (e.g., by player interface 1218/recording player module 1012). For instance, player interface 1218 may indicate a time position within a recording at the time that a process step tag is applied. Player interface 1218 may be configured to maintain time information in any manner, including in seconds, or tenths, hundredths, thousandths, or smaller increments of seconds, etc.

An advantage of using a time position indicated by player interface 1218 within a recording to provide time data is the flexibility this approach allows. Because the time information is indicated by player interface 1218, as opposed to a timer or other clock, annotation may be performed at speeds other than real-time, such as either faster or slower than real time. For example, an audio and/or video recording may have periods of silence or inactivity. A scorer could "fast-forward" through the silence/inactivity to a next period of activity, and then return to a normal speed for continued annotation. In another example, where very precise timing measurements are required, the speed of play provided by player interface 1218 may be slowed to a fraction of real time to allow for very precise annotation. Combined with high-speed cameras, which can achieve very high frames per second (fps) rates of 40,000 to 250,000 fps, time intervals of ten-, hundred-thousandths, or less, of a second may be captured. The speeds of playback is controllable by the scorer at any point during annotation, such that the scorer may transition from a playback speed of 1.0× (real-time) to 2.0× (fast-forward), to 0.1× (slow-motion) or any other combination as dictated by the needs of the scorer. Additionally, the scorer can play a recording in reverse using player interface 1218 because the scorer may have missed a correct point in time to add an annotation.

Such benefits may also be realized by quality assurance (QA) processes. A QA reviewer can review a recording at speeds other than and including real-time, can reverse to review/adjust annotations, or can go to any point in the recording desired.

It is noted that process step tag module 1014, attributes applicator module 1016, and discoveries applicator module 1018 may each use recording position information indicated by player interface 1218 (e.g., a current position in the recording, either audio or video) to derive time information. For instance, process step tags may contain a time position element. Using the time information contained in a process step tag, or through the combination of process step tags (e.g. as beginning and ending points of a process step) time information can be derived, such as the duration of that process step, the point in the recording the step occurred, etc. Additionally, discoveries may also be related to a specific time in the recording. Using recording player module 1012 to extract time code information from the recording allows the scorer performing annotation activities to dynamically select the speeds at which they review the recording. For example, the scorer may opt to "fast-forward" through periods of inactivity in the recording, while slowing the player to speeds slower than real time to annotate activities where the operator (the subject of the recording) performs tasks in rapid succession. The ability to vary the speed of the recording playback while annotating a process instance greatly increases both the efficiency (through "fast-forwarding") and accuracy ("slow-motion") of the annotation.

Process step detail interface 1208 is configured to indicate information regarding a currently selected process step in process tree 1220. For example, FIG. 12 shows a plurality of tabs that may be selected to show different types of information for the selected process step in process step detail interface 1208, including a "definition" tab that may be selected to display a definition of the process step, a "rules" tab that may be selected to display any existing rules regarding usage of the process step, a "basic info" tab that may be selected to display a description of the process step, and an "examples" tab that may be selected to display any available examples of the process step.

Process instance detail interface 1212 is configured to indicate information regarding the current process instance 112 being annotated. For example, process instance detail interface 1212 may show the process ID for the process instance, the file location for the process instance, and/or further information regarding the process instance.

Referring back to FIG. 9, in step 906, the user is enabled to apply an attribute to the recording. For example, in an embodiment, attributes interface 1108 may be configured to enable the user to apply one or more attributes to a recording (e.g., image/video recording 116 and/or audio recording 114). An attribute value can be assigned to a process instance selected from a plurality predefined values. For instance, an attribute may pose a question to the user regarding the captured recording. The user determines an answer to the question from the predefined values, in a multiple choice question and answer manner. The user is enabled by attributes interface 1108 to select and apply the predefined value for the attribute to the process instance.

Figure 14:
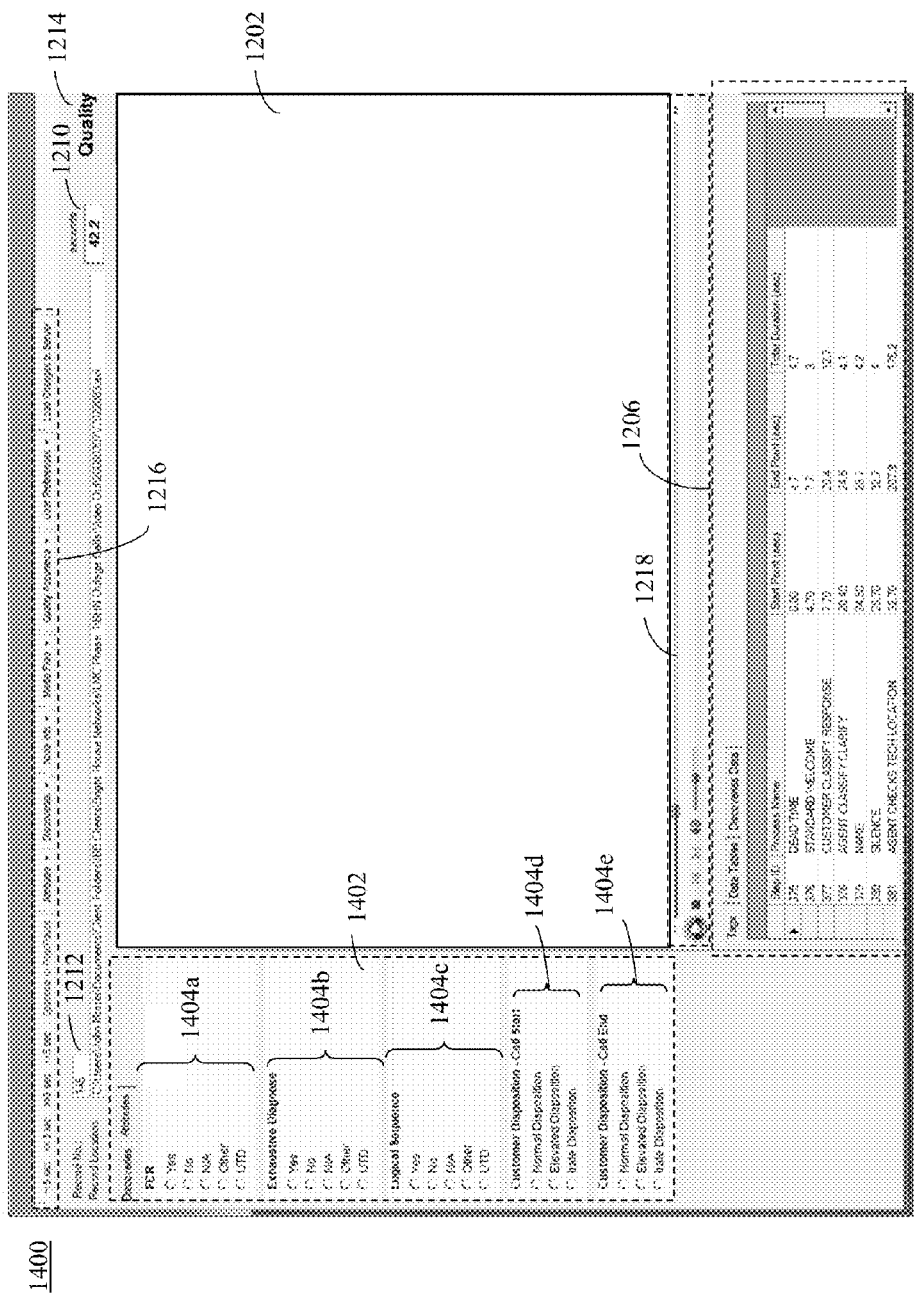

GUI 1100, including attributes interface 1108, may be configured in various ways to perform step 906. For example, FIG. 14 shows a portion (e.g., a left side) of a GUI 1400 generated by user interface generator 1010 shown in FIG. 10, according to an embodiment. GUI 1400 is similar to GUI 1200, with differences described as follows. As shown in FIG. 14, GUI 1400 includes video display interface 1202, tagged process step indicator interface 1206, current recording duration indicator 1210, process instance detail interface 1212, current workflow task indicator 1214, menu interface 1216, recording player interface 1218, and an attributes interface 1402. Attributes interface 1402 is an example of attributes interface 1108 of FIG. 11. Further portions of GUI 1400 may not be visible in FIG. 14.

Attributes interface 1402 may be displayed in GUI 1400 by interacting with the attributes menu item in menu interface 1216, or in another manner. Attributes interface 1402 is configured to enable a user to apply one or more attributes to the process instance 112 associated with the current recording. For example, as shown in FIG. 14, attributes interface 1402 displays five attribute value selectors 1404a-1404e for five corresponding attributes. Although each of attribute value selectors 1404a-1404e is shown as a radio button used to select one value of a set of optional values, attribute value selectors 1404 may each be an alternative type of user interface element, such as a check box, a drop-down menu, a text box, or other user interface element type. Each of attribute value selectors 1404a-1404e enables a user to select a value for the corresponding attribute from the list of optional values.

During a configuration phase for process annotation system 302, attributes and their corresponding optional values may be determined for the process corresponding to a process instance 112. When a process instance 112 is requested for annotation (e.g., in step 606 of FIG. 6, from server 506), the attributes may be received in configuration information transmitted with the process instance 112 (e.g., in step 608 of FIG. 6). For instance, FIG. 10 shows configuration information 1022 including attributes 1028, which may include one or more attributes and their corresponding optional values. Attributes 1028 may be included in any form in configuration information 1022, including in the form of a data array, a data table, or other form. In this manner, when a process instance 112 is received for annotation, attributes applicator module 1016 is configured to generate attributes interface 1108 "dynamically" to include the particular attributes received in attributes 1028 in configuration information 1022, which may vary from study to study, or even process instance to process instance.

During annotation of the process instance 112, the user may select a value for each attribute displayed in attributes interface 1402. The attribute values selected for process instance 112 may be subsequently analyzed to determine a quality of the process. Examples of such analysis are described in further detail in the next subsection further below. As shown in FIG. 10, the attribute values assigned by the user to process instance 112 by interacting with attributes interface 1402 may be output from attributes applicator module 1016 and stored in storage 1004 as annotated attributes 1034. Annotated attributes 1034 are included in annotated information 1024 for process instance 112.

Referring to the example of FIG. 14, attribute value selector 1404a indicates an attribute of "FCR" (first call resolution), having user selectable values of "Yes," "No," "N/A," "Other," and "UTD" (unable to determine). Attribute value selector 1404b indicates an attribute of "Exhaustive Diagnose," having user selectable values of "Yes," "No," "N/A," "Other," and "UTD." Attribute value selector 1404c indicates an attribute of "Logical Sequence," having user selectable values of "Yes," "No," "N/A," "Other," and "UTD." Attribute value selector 1404d indicates an attribute of "Customer Disposition—Call Start," having user selectable values of "Normal Disposition," "Elevated Disposition," and "Irate Disposition." Attribute value selector 1404e indicates an attribute of "Customer Disposition—Call End," having user selectable values of "Normal Disposition," "Elevated Disposition," and "Irate Disposition." The user selects attribute values for each of attribute value selectors 1404a-1404e based on the user's impressions of the recording (e.g., the user's impression of the agent's interactions with the customer captured in the recording) formed by playing the recording in GUI 1400.

Referring back to FIG. 9, in step 908, the user is enabled to apply discovery information to the recording. For example, in an embodiment, discoveries interface 1110 may be configured to enable the user to apply one or more discoveries to a recording (e.g., image/video recording 116 and/or audio recording 114). A discovery is free-form value that can be assigned to a process instance by the user during/after playing the recording. For example, a discovery may be an observation made by the user based on what the user heard/saw captured in the recording. The user enters information (e.g., alphanumeric text) to assign to the discovery by interacting with discoveries interface 1110.

Discoveries interface 1110 enables a user to identify a discovery, to relate it to a process instance, and to notify/permit other scorers to reuse the discovery to apply to process instances that they are reviewing/scoring. While process step tags and attributes lend themselves primarily to quantitative analysis (e.g., cycle times, average handle time, frequency of incidence, etc), discoveries provide qualitative data points. A primary mechanism by which these qualitative data points may be put into an immediate quantitative context by enabling other users (a) to be made aware of their occurrence (e.g., through notification), and (b) to apply a previously identified discovery to a process instance they are annotating (by making the discovery available to the other users by discoveries applicator module 1018). This is referred to as discovery "piggy-backing," where discoveries made by users are made available to subsequent scorers.

A discovery may be deemed quantitatively important enough to require its capture on each process instance in a current study and/or in future studies. In such a case, the captured discovery information may enable the creation of a related annotation to be included in a follow-up and/or follow-on study.

For instance, an ongoing study of a call center process may reveal that one or more agents are often placing customers on hold while performing a cumbersome system activity, as this allows them to remain "occupied" (i.e., on the call, so no new calls are presented to their station) while they complete the activity. This issue of placing customers on hold while performing cumbersome system activities may be noticed by a scorer of a process instance, who associates a discovery with the process instance describing the issue. Upon reviewing this discovery and the number of times it was observed by scorers facilitated by "piggy-backing"), it may be decided that this issue should be tracked for each call in the current study (follow-up) and/or in future studies (follow-on). This discovery may be tracked for each process instance (e.g. a recorded process being performed) in the current study and/or future studies by creating an attribute, which will be configured into the interface when process instances are requested for annotation. In the current example, such an attribute might require a response to the question, "Did the agent place the customer on hold to work in system?" The attribute may have selectable response options such as "Yes—billing adjustment," "Yes—new account," "Yes—other," "No," "UTD (Unable to Determine)," and/or "N/A," for example.

Figure 15:
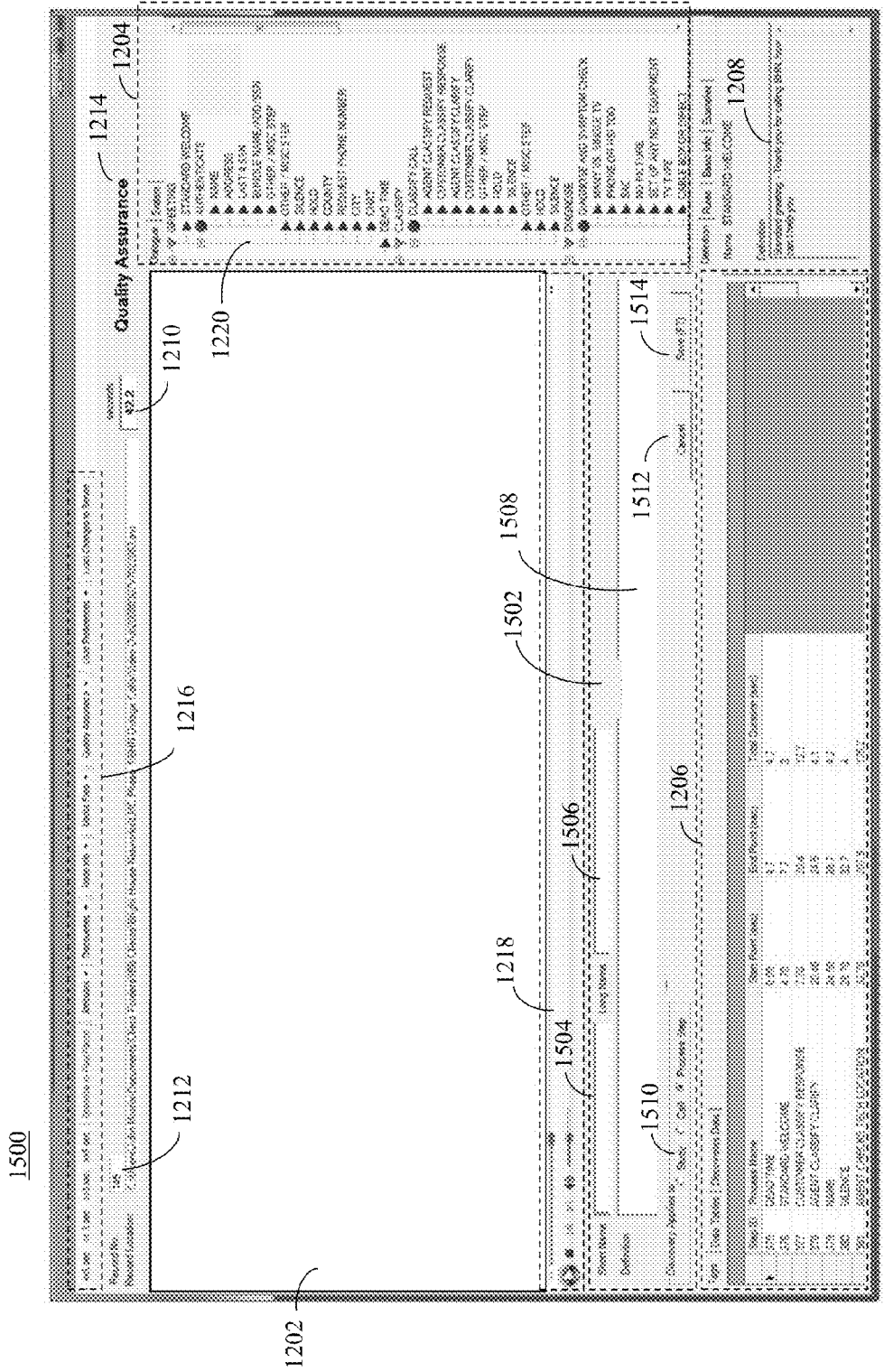

GUI 1100, including discoveries interface 1110, may be configured in various ways to perform step 908. For example, FIG. 15 shows a GUI 1500 generated by user interface generator 1010 shown in FIG. 10, according to an embodiment. GUI 1500 is similar to GUI 1200, with differences described as follows. As shown in FIG. 15, GUI 1500 includes video display interface 1202, process step tag interface 1204, tagged process step indicator interface 1206, process step detail interface 1208, current recording duration indicator 1210, process instance detail interface 1212, current workflow task indicator 1214, menu interface 1216, recording player interface 1218, and a discoveries interface 1502. Discoveries interface 1502 is an example of discoveries interface 1110 of FIG. 11.

Discoveries interface 1502 may be displayed in GUI 1500 by interacting with the discoveries menu item in menu interface 1216, or in another manner. Discoveries interface 1502 is configured to enable a user to apply one or more discoveries to the process instance 112 associated with the current recording. For example, as shown in FIG. 15, discoveries interface 1502 displays several interface elements, including a short name entry box 1504, a long name entry box 1506, a definition entry box 1508, a discovery assignment selector 1510, a cancel button 1512, and a save button 1514. Alternative types of user interface elements other than those shown in FIG. 15 for discoveries interface 1502 may also or alternatively be present. Short name entry box 1504 enables the user to enter a short name for a discovery. Long name entry box 1506 enables the user to enter a longer (e.g., more descriptive) name for the discovery. Definition entry box 1508 enables the user to fully describe the discovery. Discovery assignment selector 1510 enables the user to assign a level to the discovery. For instance, in the example of FIG. 15, discovery assignment selector 1510 is shown as a radio button, which enables the user to select a level for the discovery of one of "study" (e.g., applies to current study), "call" (e.g., applies to the current process instance), or "process step" (e.g., applies to the current assigned process step). Cancel button 1512 enables the user to cancel the discovery if selected. Save button 1514 enables the discovery to be saved if selected. For example, as shown in FIG. 10, discoveries assigned by the user to process instance 112 by interacting with discoveries interface 1110 may be output from discoveries applicator module 1018 and stored storage 1004 as annotated discoveries 1036. Annotated discoveries 1036 are included in annotated information 1024 for process instance 112.

During annotation of the process instance 112, the user may input one or more discoveries for process instance 112 into discoveries interface 1502. The discoveries input for process instance 112 may be subsequently analyzed to determine a quality of the process. Examples of such analysis are described in further detail in the next subsection further below. Furthermore, discoveries input by one user for process instance 112 may be provided to other users that annotate process instances included in the same study as process instance 112 (e.g., if "study" is selected by discovery assignment selector 1510 for process instance 112). For instance, when a process instance is requested for annotation (e.g., in step 606 of FIG. 6, from server 506), the discoveries input by other users may be received in configuration information transmitted with the process instance 112 (e.g., in step 608 of FIG. 6). For instance, FIG. 10 shows configuration information 1022 including discoveries 1030, which may include one or more discoveries input by other users to process instances within the same study.

Figure 16:
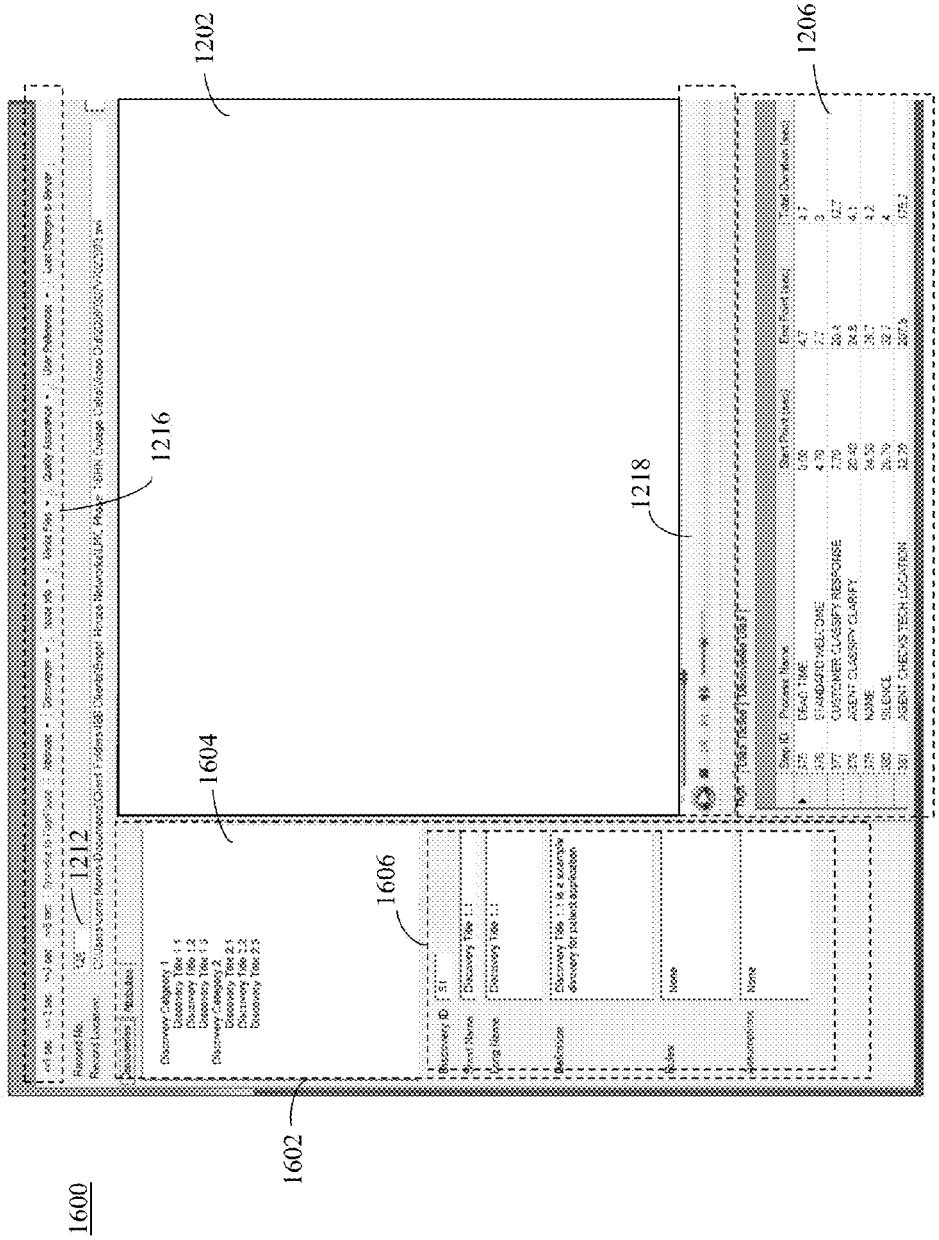

For example, FIG. 16 shows a portion (e.g., a left-side portion) of a GUI 1600 generated by user interface generator 1010 shown in FIG. 10, according to an embodiment. GUI 1600 is similar to GUI 1200 (FIG. 12), with differences described as follows. As shown in FIG. 16, GUI 1600 includes video display interface 1202, tagged process step indicator interface 1206, process instance detail interface 1212, menu interface 1216, recording player interface 1218, and a discoveries interface 1602. Discoveries interface 1602 is an example of discoveries interface 1110 of FIG. 11.

Discoveries interface 1602 may be displayed in GUI 1600 by interacting with the discoveries menu item in menu interface 1216, or in another manner. Discoveries interface 1602 is configured to enable a user to view one or more discoveries previously applied to the process instance 112 associated with the current recording. For example, as shown in FIG. 16, discoveries interface 1602 displays several interface elements, including a discovery tree 1604 and a discovery detail interface 1606. Discovery tree 1604 enables the user to view a list of discoveries entered previously by other users. If during the playing of a current recording, the user determines a discovery listed in discovery tree 1604 that is applicable to the current recording, the user may select the discovery in discovery tree 1604 to be assigned to the recording (e.g., to the present section of the recording). For example the user may double click the listed discovery to cause it to be assigned. In this manner, a study can ascertain a rate of incidence for particular discoveries. Discovery detail interface 1606 enables the user to view details of the discoveries included in discovery tree 1604. For instance, the user may select a discovery in discovery tree 1604 (e.g., with a single click) to be enabled to view details corresponding to the discovery in discovery detail interface 1606. In this manner, the user is enabled to determine whether a particular discovery is applicable to the current recording, by viewing the description of the discovery in discovery detail interface 1606. In the example of FIG. 16, discovery detail interface 1606 displays a discovery ID (e.g., a numeric value) assigned to the discovery, displays the short name, the long name, and the definition previously assigned to the discovery (e.g., by interacting with discoveries interface 1502 in FIG. 15), and displays any rules and any assumptions assigned to the discovery.

In step 910, annotation information associated with the process instance is generated that includes the process step tag, the attribute, and the discovery information. As shown in FIG. 10, annotated process steps 1032, annotated attributes 1034, and annotated discoveries 1036 associated with process instance 112, and generated by the user by interacting with process annotation tool 1008, are included in annotated information 1024. In a client-server embodiment, such as shown in FIG. 5, annotated information 1024 may be transmitted to server 506, to be stored in storage 508 in association with process instance 112. Annotated information 1024 may be packaged with process instance 112 (e.g., stored in the same file) or maintained separately.

Process annotation tool 1008 (FIG. 10) and/or flowchart 900 (FIG. 9) may be implemented in hardware, software, firmware, or any combination thereof. For example, process annotation tool 1008 and/or flowchart 900 may be implemented as computer code configured to be executed in one or more processors. Alternatively, process annotation tool 1008 and/or flowchart 900 may be implemented as hardware logic/electrical circuitry.

Annotation information may be generated for any number of process instances included in a study. The annotation information generated for the process instances of the study may subsequently be analyzed (e.g., by process analysis system 306 of FIG. 3) to enable improvements to be made to the underlying process. The next subsection describes example embodiments for conducting process studies.

C. Example Embodiments for Process Studies

A process study may be performed to determine improvements to a process, including a manufacturing or service related process. Example embodiments are described for implementing a process study. In embodiments, a process study may include one or more of a decomposition of a process into its component parts, an annotation or "mark-up" of instances of the process with process step tags, attributes, and discoveries (as described in the prior subsection), the calibration of the annotation of the process instances, a quality assurance review procedure, and an analysis of the resulting annotation information.

Embodiments of the present invention enable numerous benefits: A process study may be configured, including a determination of process steps, participants, locations, companies, etc. A work flow for process mark-ups, scorers, etc., is enabled to be managed. Process performance measurements are enabled to be captured, including systems steps, dialogue steps, and/or other activities that may or may not occur simultaneously. "System steps" are process steps performed in the form of actions (e.g., human actions, machine actions, human-machine interactions) that are typically captured with a video recording. For example, an agent may perform system steps by interacting with a computer (e.g., entering data) at an agent station 214 shown in FIG. 2. "Dialogue steps" are process steps performed in speech that are typically captured with an audio recording. For example, an agent may perform dialogue steps during a conversation with a customer over a telephone at an agent station 214. In embodiments, system steps and dialogue steps may be monitored, analyzed, and/or annotated separately or in parallel, as described above. Attributes are enabled to be captured, which may be associated with a process instance and/or a process step. Discoveries (e.g., qualitative observations) are enabled to be captured and associated with a process instance, a process step, a geographic location, a system, and/or a process participant. Such discoveries may be newly generated or may have been previously captured. Additional, follow-up analyses on previously annotated processes instances may be rapidly deployed-specific portions of previously reviewed processes may be easily reviewed/analyzed and additional annotation information may be applied. Performance data of different businesses (or even industries) that perform similarly processes (e.g., "benchmarking") is enabled to be compared.

In conventional techniques for conducting time and motion studies, including direct observation of live operator interactions (often referred to as "side-by-sides"), the validity of measurements or annotations could easily be called into question. Embodiments of the present invention address this shortcoming by enabling the ability to list and review each instance of any annotation that is questioned. For example, if the occurrence of a specific behavior is disputed or more details are requested, the study recipient (user of the study results) can select each instance of the behavior in question by querying for the appropriate discovery/annotation. From the resulting list of instances, the study recipient can then instantiate an instance of the player directed to the position in the recording at which the behavior in question is displayed. This provides "proof" that the behavior indeed occurred each time the annotation was applied.

Figure 17:
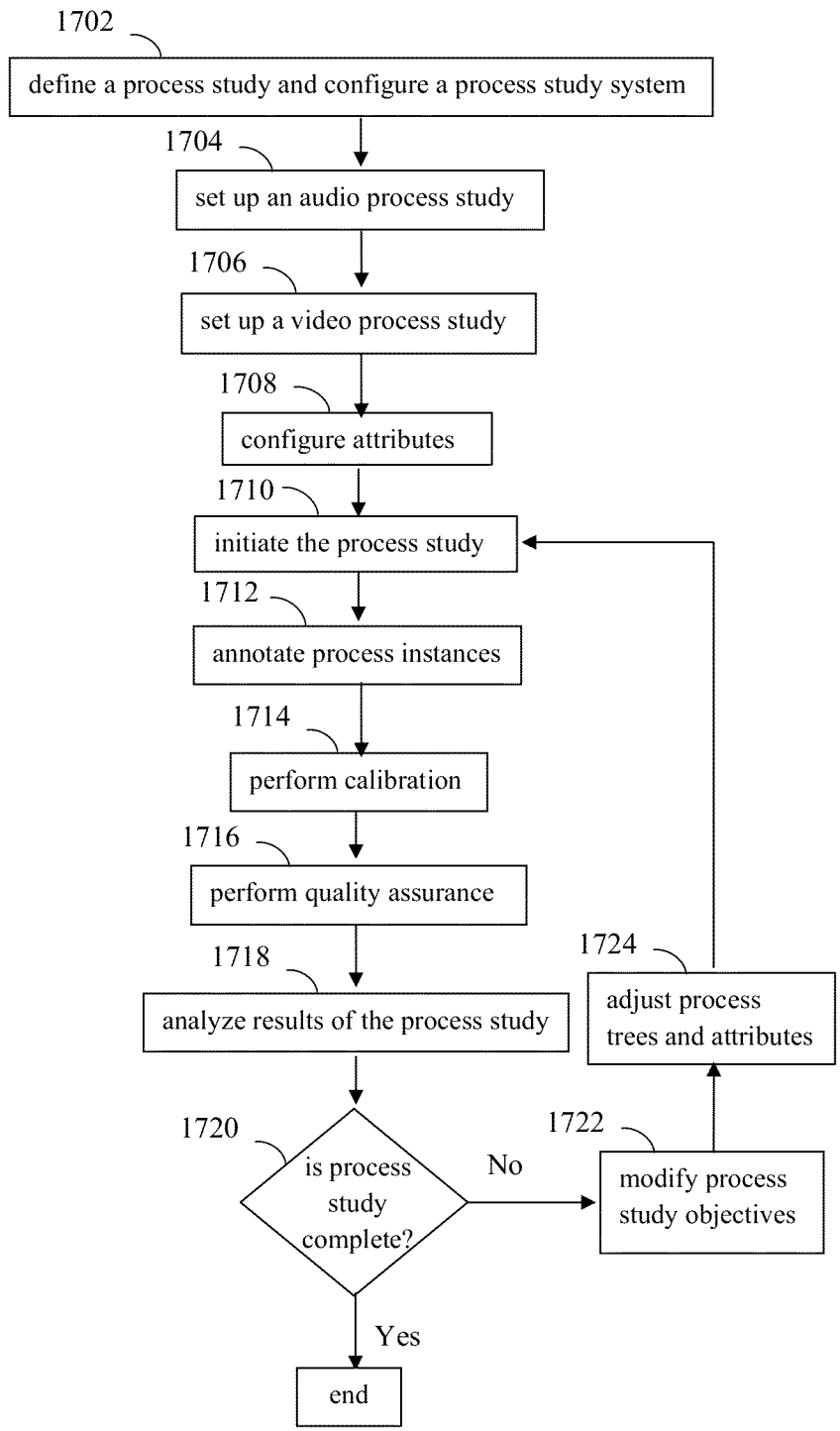
FIG. 17 shows a flowchart for configuring and performing a process study, according to an example embodiment of the present invention.

Process studies may be configured and conducted in a variety of ways. For instance, FIG. 17 shows a flowchart 1700 for configuring and performing a process study, according to an example embodiment. FIGS. 18-22 show additional flowcharts providing example embodiments for various steps of flowchart 1700. Further structural and operational embodiments will be apparent to persons skilled in the relevant art(s) based on the discussion regarding flowchart 1700 and the flowcharts of FIGS. 18-22. Note that the steps of flowchart 1700 and of the flowcharts of FIGS. 18-22 do not necessarily need to be performed in the orders shown. Furthermore, not all steps of flowchart 1700 need to be performed in all embodiments. Flowchart 1700 is described as follows.

Flowchart 1700 begins with step 1702. In step 1702, a process study is defined and a process study system is configured. A process to be studied is determined in step 1702. The process may be a manufacturing process or a service process. For example, the process may be that of an agent-customer interaction process conducted by a call center that relates to a particular product or service, or any other suitable process described elsewhere herein or known to persons skilled in the relevant art(s). A process study system may be configured to perform the process study. For instance, such a process study system may include one or more of process monitoring system 104 (FIG. 1), process annotation system 302 (FIG. 3), and process analysis system 306 (FIG. 3). The process study system may be configured to include any number of persons, computers and/or other equipment, locations, etc., to perform the study. For example, process annotation system 302 may be configured as a process annotation tool 408 operating on computer 402, as shown in FIG. 4, as client-server system 500 shown in FIG. 5, where process annotation tools 510 access process instances at a server 506, or in any other suitable configuration described herein or otherwise known.

In step 1704, an audio process study is set up. Step 1704 is optional. Step 1704 may be performed when it is determined that the studied process has an audio component, such as when one or more persons speak when the studied process is conducted. The audio process study is configured so that the audio component of the studied process may be recorded for subsequent analysis.

In step 1706, a video process study is set up. Step 1706 is optional. Step 1706 may be performed when it is determined that the studied process has a visual component, such as when images and/or video are captured of the studied process when the studied process is conducted. The video process study is configured so that the video component of the studied process may be recorded for subsequent analysis. Note that the video process and audio process studies may be integrated and may be configured to be performed simultaneously (e.g., such that video and audio aspects of a process may be recorded simultaneously).

In step 1708, attributes are configured. Step 1708 is optional. Step 1708 may be performed when it is determined that the studied process has attributes desired to be analyzed, with each attribute having more than one possible value. The attributes are configured by defining the attributes and their optional values.

In step 1710, the process study is initiated. The process study configured in steps 1702-1708 is initiated. Steps 1712-1720 may be performed when conducting the process study.

In step 1712, process instances are annotated. As described in the prior subsection (e.g., with respect to FIGS. 9-16), process instances, such as process instances 112, may be annotated with process step tags (for audio recordings and/or for video recordings), attributes, and/or discoveries, as described above. For example, flowchart 900 shown in FIG. 9 may be performed during step 1712.

In step 1714, calibration is performed. For example, during step 1714, the process of annotating process instances may be calibrated so that users performing annotations provide such annotations in as uniform manner as possible, so that the annotations may be subsequently analyzed. It useful to ensure that the users (e.g., "scorers") use the same or similar assumptions and definitions. One or more calibration iterations may be performed for the process study.

In step 1716, quality assurance is performed. Quality assurance may be performed with respect to particular users (e.g., scorers) and/or to the study as a whole to ensure that annotations made accurately.

In step 1718, results of the process study are analyzed. The results of the process study—annotated process instances—may be analyzed to measure how well the studied process is performing, and to potentially determine improvements to the studied process. For example, referring to FIG. 5, each of annotated process instances 112a-112c has associated annotation information 304a-304c, which may include annotated process steps 1032, annotated attributes 1034, and/or annotated discoveries 1036 (FIG. 10). Annotation information 304a-304c for annotated process instances 112a-112c may be compared/analyzed to determine how well the studied process is performing, and may be used to improve the current study and/or future studies. Step 1718 may be performed by process analysis system 306 (FIG. 3), for example.

A variety of types of analysis may be performed. For instance, in previous approaches to conducting time and motion studies, the ability to selectively follow-up on a study by determining features of the study needing tracking and then to quickly gather that information was limited. In embodiments, such information is enabled to be quickly and accurately gathered from annotation information 304 associated with previously annotated process instances. Similarly, follow-on studies may select a process step that was "tagged" at a high level in previously annotated process instances, and may decompose that process component into a plurality of more detailed process steps. For instance, this may be performed for a process step that drives surprising variation in the measurement of process instances that share this process step.

For example, the AHT of process instances of a similar type (e.g., "call type") may have a wide standard deviation which, in turn, is driven almost exclusively by a specific process step. For the process step in question (hereafter referred to as the "parent process"), it may be desirable to understand quantitatively which sub-steps of the parent process step might be driving the variation. This is enabled by referring to the study which revealed the variation caused by the parent process step and examining the parent process step in greater detail to decompose it into a plurality of lower-level process steps (hereafter referred to as "sub-steps"), which can be used to analyze the parent process step in more detail. Once the sub-steps for the process step in question have been identified, previously annotated process instances that include the parent process step may be re-scored using the sub-steps. This activity is greatly accelerated by using the previous annotations to isolate the parent process step. Doing so, only the portion of a recording containing the parent process step is reviewed and re-scored using the sub-steps, rather than reviewing the whole recording. This is a very efficient approach to performing follow-up analysis on selected process steps. Additionally or alternatively, each of the sub-steps may be tagged in subsequent process instance annotations. In this manner, real drivers of variation (e.g., a confusing call script, a clunky system design, a long duration call to a web/database server, etc.) can be identified and corrected.

The process steps defined for a studied process enable measuring audio (e.g., dialogue) and/or video (e.g., computer system, production line, etc.) components of the studied process at a granular level, and enables generation of a significant amount of useful data regarding the studied process. A process catalog includes a set of standard process steps from which customer service processes may be annotated. The standard process steps may be standard for a particular industry, or may be standard process steps across a number of industries, including all industries. Such a process catalog enables a comparison of process flows (e.g., "benchmarking") across different people, units (e.g., different call centers), geographies, companies, industries, etc. Typically, benchmarking across industries is very difficult to perform. For instance, an insurance company may desire to compare how different airline companies handle ticket changes to understand potential improvements for claims processing. Using a process catalog, the ticket handling process may be mapped against other types of processes to discern different, and potentially greatly improved, approaches.

As many studies across many industries are completed, the mapping of a particular company's manufacturing and/or service processes back into a shared process catalog will allow process performance comparisons across the companies and industries. This benchmarking capability, facilitated through a standard process catalog, is of significant economic value.

The annotation information generated for process instances of a studied process can be used to generate various process cycle time measurements (e.g., by process analysis system 306), which include, but are not limited to:

Average Handle Time,
Average Handle Time by process instance type,
Average Handle Time by process step,
Average Handle Time histogram,
Work Time Distribution by process instance type,
Work Time Distribution by process step,
Work Time Distribution by system/system step,
Standard deviation by process instance type,
Standard deviation by process step, and
Standard deviation by system/system step.

Each of these cycle time measurements are described as follows. Although described as follows with regard to a call center, these cycle time measurements may be applied to other systems and processes.

Average Handle Time (AHT): AHT is a typical call center metric for the average duration of one call or transaction. AHT is typically measured from the customer's initiation of the call and including any hold time, talk time and after-call work (related tasks that follow the call). AHT is a key metric, combined with incoming volume, for determining staffing levels. AHT is typically calculated as a duration of call from call start (e.g., served to agent's station) to completion of "after call work." AHT may be measured in seconds, minutes, or other time standard. Conventional techniques (e.g. live observation) do not adequately enable capturing of an intermingling of call AHT (e.g., where agents seek to increase their productivity metrics by continuing after call work while initiating another call). Embodiments of the present invention enable activities to be "tagged" in the separate calls, and thus enable the attaining of an accurate sense of (1) AHT assigned to each process instance, and (2) an effect (e.g., a loss of productivity through distraction, increase through parallel processing, etc.) of continuing activities from one call while beginning another call.

AHT by process instance type: AHT, as defined above, may be broken down by process instance type, such as by call type (e.g. new order calls vs. billing inquiry calls vs. service trouble calls, etc). AHT by process instance type is calculated similarly as described above for AHT, but is confined to specific call types (AHT as described above typically encompasses all call types). The different AHTs can be compared by separating the call types (process instance types). For example, calls related to new orders will typically last much longer than balance inquiry calls. AHT by process instance type may be important for call centers that route calls by call type, as each call type will have different inbound volume (# of calls/hour or/day) and AHTs, leading to different staffing calculations for any desired service level.

AHT by process step: AHT, as defined above, may be broken out by process step. The process step can be confined to a single process instance type, or across all types. AHT by process step is calculated similarly as described above for AHT, but is confined to specific process steps (e.g. a greeting step, or more granularly, an "agent provide standard greeting" step). AHT by process step may be used to identify, within a process, where time is being spent. By identifying which process steps require the most time, management can seek to reduce the AHT required, for example. This may be reviewed in concert with WTD and SD to ensure an effort to increase efficiency is worthwhile.

AHT histogram: A histogram may display statistical information that uses rectangles to show the frequency of data items in successive numerical intervals of equal size. A histogram may be generated by counting and plotting numbers of occurrences within specified ranges. Histograms show the frequency of occurrences within a series of ranges. This becomes useful to identify outliers from the norm, of where multiple modes exist within a dataset. When a histogram shows multiple modes, it is typically an indication of independent variable acting on the process. Identification of this variable and measures to control it can bring the process back under control and reduce variability. Histograms may be applied to process instance types and process steps to identify why outliers are occurring.

Work Time Distribution (WTD) by process instance type: WTD may be calculated by multiplying the AHT of a call type by the number of instances of that call type, then dividing by the AHT of all calls (WTD=AHT by call type×number of call types received/AHT of all calls). WTD may provide an indication of where productive time is being spent overall. For example, new order calls can be long in duration, but infrequent. Billing inquiry calls might be frequent, but short in duration. Understanding which call accounts for more % of effort for the call center is difficult without a WTD calculation. WTD enables a determination to be made of exactly how much time is being spent, as a % of total work time, on these two call types.

WTD by process step: WTD, as defined above, may be broken out by process step. WTD by process step is calculated similarly as described above for WTD, but is filtered by process step. WTD by process step can be determined within a specific process instance type (call type) or across multiple call types. WTD by process step can be analyzed to determine a more granular understanding of where time is being spent (and thus where efficiency gains may be found). This may help management to identify where to "place their bets," that is where to focus for efficiency improvement. Even if a particular call step has a very long AHT, a wildly erratic standard deviation, and/or if it accounts for a very low % of WTD, improving it in terms of these measures (AHT, SD) may have relatively little impact of overall call center efficiency. In such case, management may desire to focus on process steps with significant WTD % to effect larger increases in efficiency.

WTD by system/system step: WTD by system/system step is calculated similarly as described above for WTD, but is specific to systems.

Standard deviation (SD) by process instance type: SD is a measure of the variability or dispersion of a data set. SD may be calculated as shown below as Equation 1:

$$\sigma = \sqrt{\frac{1}{N}\sum_{i=1}^{N}(x_i - \bar{x})^2}, \quad \text{Equation 1}$$

SD may be calculated for a process instance type to indicate whether the process step is less variable (and thus more predictable), or whether the process is more variable (less predictable). An erratic process instance type (e.g., call type) can indicate an issue or problem, such as a troublesome process step or a poorly defined process flow.

SD by process step: SD by process step may be calculated according to Equation 1, but constrained to a particular process step. Process steps, either across process instance types or within a single process instance type, having wide standard deviation may indicate an issue. By applying corrective action to a process step (e.g., better defining a process/procedure), the process step may become more predictable, improving resulting staffing models, etc.

SD by system/system step: SD by system/system step may be calculated according to Equation 1, but constrained to a particular process step, specific to system activities.

As raw data becomes available through the completion of annotating calls in a call center or other implementation, the resulting analysis may raise additional questions. These questions can be addressed through refining the study objectives, and incorporating the refinements into future implementations of the same study or entirely new studies. Also, because the raw material is typically in the form of recordings, previously annotated calls can be referred to, to quickly go back to select calls and select parts of those calls to find the data that is required. This is potentially a timesaver and efficiency gain over only incorporating data into studies going forward.

Furthermore, real benefits accrue when a study continues to be repeated in normal intervals. This allows any changes in performance to be noted and appropriate action taken (e.g. stopping declining performance, enhancing performance improvement, etc.).

In step 1720, whether the process study is complete is determined. If the process study is determined to be complete, the process study ends. If the process study is not determined to be complete, steps 1722 and/or 1724 may be performed.

In step 1722, objectives of the process study are modified. As described above, if desired, objectives of a process study may be modified. As the results of the process study become available, the study objectives may be refined. Refinements in the process study objectives (for example, a new attribute to be tracked) can easily be incorporated. Because process instances (e.g., recordings) of a completed study have already been annotated, follow-on or added objectives can be isolated to a particular call type (in the case of a call center) or even process step. Because annotated calls contain this data, the scorer can simply go to the process step in question to determine a new attribute value—instead of having to listen/view to the full recording all over again. This is superior to live observations for which no review can be performed.

In step 1724, process trees and attributes are adjusted. For instance, new process steps to be tracked can be added to a process tree, existing process steps can be modified in a process tree, and/or process steps determined to not be occurring may be removed from a process tree. Furthermore, new attributes may be added, and existing attributes can be modified and/or removed.

After steps 1722 and 1724 are performed, operation returns to step 1710, where the process study is re-initiated.

Figure 18:
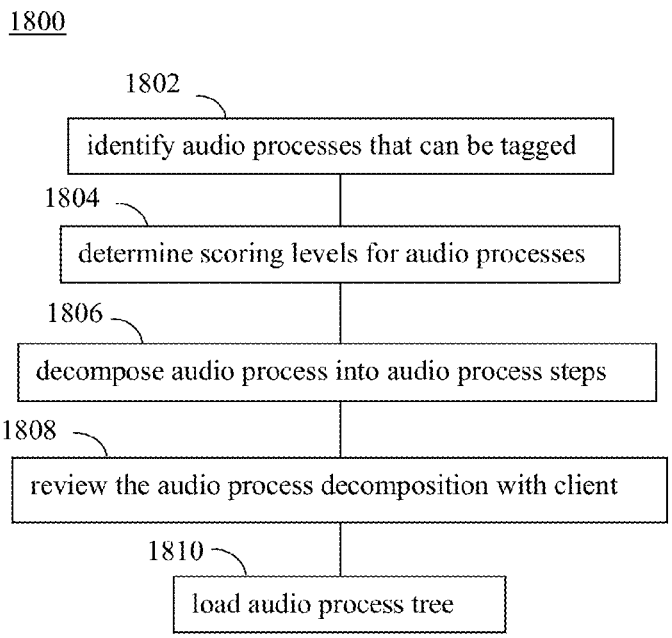
FIGS. 18-22 show additional flowcharts providing example embodiments for various steps of the flowchart shown in FIG. 17.

FIG. 18 shows a flowchart 1800 for setting up an audio process study (performing step 1704), according to an example embodiment. Flowchart 1800 is described as follows. In step 1802, audio processes that can be tagged are identified. One or more audio components (e.g., dialogue between one or more individuals) of a studied process can be identified to be recorded, annotated, and analyzed.

In step 1804, scoring levels (e.g. process levels) for audio processes are determined.

In step 1806, an audio process is decomposed into audio process steps. An audio process (an audio component of a studied process) can be decomposed into process steps that are performed every time the process is performed and/or that may be performed when the process is performed. Processes typically include multiple processes steps. Often these individual process steps can be further decomposed into yet further sub-steps. The technique of breaking a process into smaller and smaller sub-steps is known as process decomposition. A product catalog of previously existing standard and/or non-standard process steps may be referred to, to aid in determining audio process steps for a studied process.

In step 1808, the audio process decomposition is reviewed with client. If the client does not perform step 1806, the process steps determined in step 1806 may be reviewed with the client to determine whether the process steps are adequate for the audio process, or whether new process steps need to be added, or process steps need to be modified or removed.

In step 1810, an audio process tree is loaded. An audio process tree (similar to process tree 1220 shown in FIG. 12) may be formed from the process steps determined in step 1806 (and reviewed in step 1808). The audio process tree may be loaded into a process annotation system (e.g., process annotation system 302 of FIG. 3) to be provided to scorers with process instances to be annotated.

Figure 19:
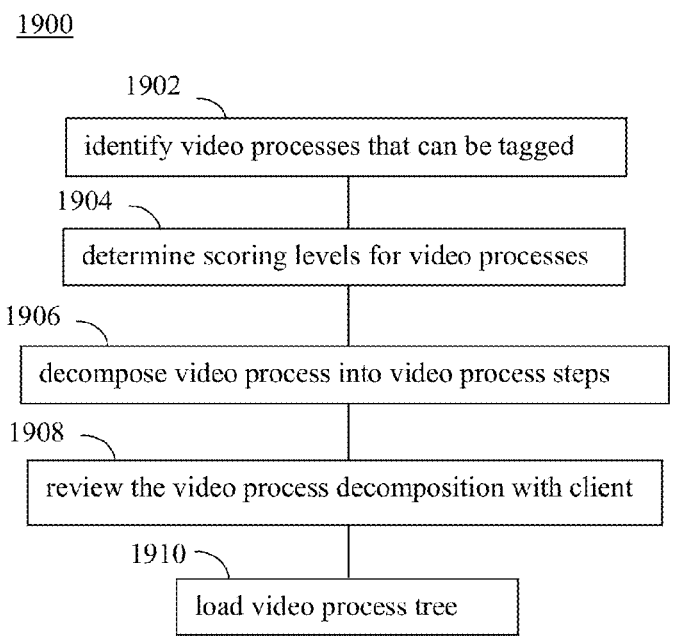

FIG. 19 shows a flowchart 1900 for setting up a video process study (performing step 1706), according to an example embodiment. Flowchart 1900 is described as follows. In step 1902, video processes that can be tagged are identified. One or more image/video components (e.g., actions of persons and/or machines, computer screen content, etc.) of a studied process can be identified to be recorded, annotated, and analyzed.

In step 1904, scoring levels for video processes are determined.

In step 1906, a video process is decomposed into video process steps. A video process (a video component of a studied process) can be decomposed into process steps that are performed every time the process is performed and/or that may be performed when the process is performed. A product catalog of previously existing standard and/or non-standard process steps may be referred to, to aid in determining video process steps for a studied process.

In step 1908, the video process decomposition is reviewed with client. If the client does not perform step 1906, the process steps determined in step 1906 may be reviewed with the client to determine whether the process steps are adequate for the video process, or whether new process steps need to be added, or process steps need to be modified or removed.

In step 1910, a video process tree is loaded. A video process tree (similar to process tree 1220 shown in FIG. 12) may be formed from the process steps determined in step 1906 (and reviewed in step 1908). The video process tree may be loaded into a process annotation system (e.g., process annotation system 302 of FIG. 3) to be provided to scorers with process instances to be annotated.

Figure 20:
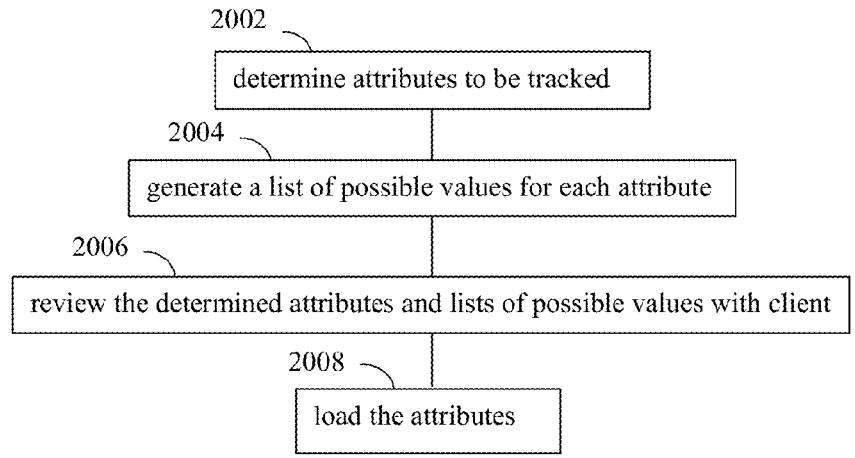

FIG. 20 shows a flowchart 2000 for configuring attributes (performing step 1708), according to an example embodiment. Flowchart 2000 is described as follows. In step 2002, attributes to be tracked are determined. One or more attributes of a studied process may be determined to be important to the studied process, and thus may be identified to be recorded, annotated, and analyzed. For example, referring to FIG. 14, an attribute such as first call resolution (FCR) (attribute value selector 1404a), which indicates whether an issue with a customer is resolved in a single call, may be determined to be desirable to track. Any attribute of a studied process may be tracked as an attribute.

In step 2004, a list of possible values is determined for each attribute. A list of possible values (e.g., possible results or outcomes that are selectable by scorers) is determined for each attribute. Each list is configured to be an exhaustive list of all possible outcomes for an attribute. For example, referring to FIG. 14, attribute value selector 1404a indicates a list of five possible values for the FCR attribute—Yes, No, N/A, Other, or UTD.

In step 2006, the determined attributes and lists of possible values are reviewed with the client. If the client does not perform steps 2002 and 2004, the attributes and their respective list of possible values determined in steps 2002 and 2004 may be reviewed with the client to determine whether the determined attributes and values are adequate for the studied process, or whether new attributes need to be added, possible values need to be modified, and/or attributes need to be removed. Note that in an embodiment, at least some of the determined attributes and possible values may be determined by an entity other than the client, such as for the purpose of benchmarking, and thus are not necessarily reviewed with the client.

In step 2008, the attributes are loaded. The attributes and their respective lists of possible values determined in steps 2002 and 2004 (and reviewed in step 2006) may be loaded into a process annotation system (e.g., process annotation system 302 of FIG. 3) to be provided to scorers with process instances to be annotated.

Figure 21:
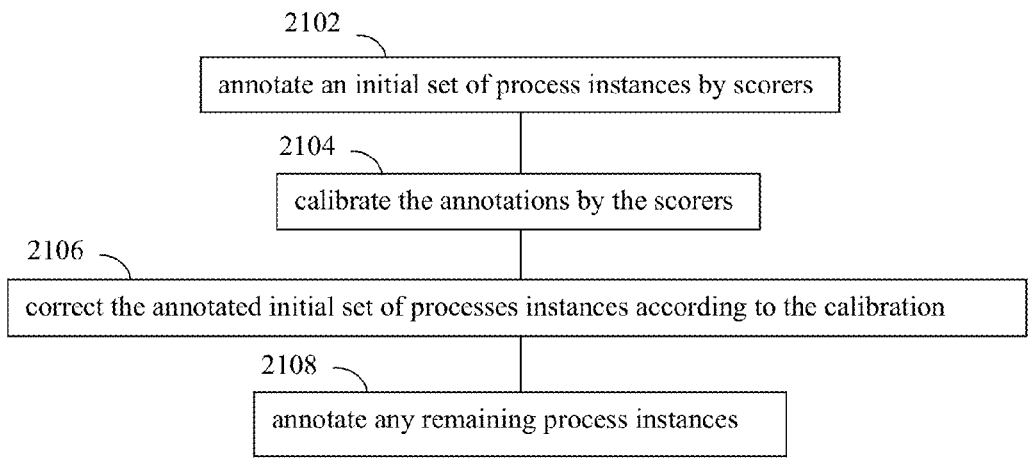

FIG. 21 shows a flowchart 2100 for performing calibration (performing step 1714), according to an example embodiment. Flowchart 2100 is described as follows. In step 2102, an initial set of process instances is annotated by scorers. For instance, each process instance of a set of process instances associated with the studied process may be annotated by a group of scorers as a calibration step, to identify any items (e.g., process steps of the process tree, attributes, etc.) that are unclear and/or need further explanation.

In step 2104, the annotations are calibrated by the scorers. The annotations made on the initial set of process instances are compared and calibrated to determine whether the process instances received similar or significantly different annotations from the scorers. If the annotations are significantly different, corrections may be needed. Because there is a degree of subjectivity as to how any particular process step may be scored, the group of scorers may meet to discuss questions and to align together on defined annotation standards.

In step 2106, the annotated initial set of processes instances is corrected according to the calibration. If the annotations made by the scorers on the initial set of process instances are significantly different, corrections may be performed.

In step 2108, any remaining process instances are annotated by the scorers.

Figure 22:
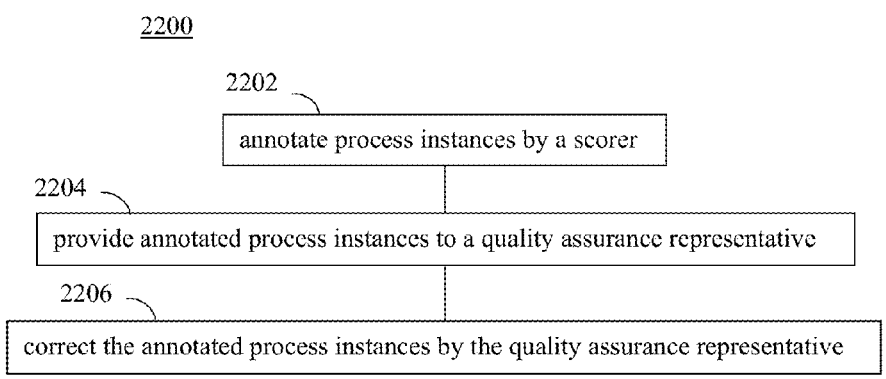

FIG. 22 shows a flowchart 2200 for performing quality assurance (performing step 1716), according to an example embodiment. Flowchart 2200 is described as follows. In step 2202, process instances are annotated by a scorer. At any desired intervals, one or more annotated process instances may be reviewed for quality assurance purposes. The annotated process instances may be reviewed to provide quality assurance with regard to particular scorers, for a process study overall, and/or for other purposes.

In step 2204, the annotated process instances are provided to a quality assurance representative. Quality assurance may be performed (by persons designated as quality assurance representatives) on a relatively higher percentage of process instances when the process study is relatively early in its lifecycle and/or when a scorer is relatively new. As the process study progresses through its lifecycle and/or the scorer gains experience, a relatively lower percentage of process instances may be reviewed for quality assurance.

In step 2206, the annotated process instances are corrected by the quality assurance representative. In an embodiment, the quality assurance representative may correct the annotated process instances, and these corrections may be maintained (e.g., stored) in association with their corresponding process instances and scorers, and the quality assurance representative. The quality assurance representative may provide feedback to the scorer with regard to the corrections made to the annotated process instance. The feedback will be factored into the percentage of process instances that will be reviewed for quality assurance for the scorer. As the scorer has fewer corrections being made by quality assurance representatives in step 2206, the less often that process instances of the scorer may be reviewed for quality assurance purposes.

Flowcharts 1700, 1800, 1900, 2000, 2100, and 2200 may be implemented in hardware, software, firmware, or any combination thereof, and may include human interaction. For example, flowcharts 1700, 1800, 1900, 2000, 2100, and/or 2200 may be implemented as computer code configured to be executed in one or more processors. Alternatively, flowcharts 1700, 1800, 1900, 2000, 2100, and/or 2200 may be implemented as hardware logic/electrical circuitry. In an embodiment, flowcharts 1700, 1800, 1900, 2000, 2100, and/or 2200 may include human interaction (e.g., humans interacting with each other and/or with a computer).

D. Example Embodiment Illustrating Process Step Tags

This section describes an example illustration of the capture, storage, and depiction of process steps and their related duration, which may be performed by process step tag module 1014 of FIG. 10 and process step tag interface 1106 of FIG. 11 (e.g., according to step 904 shown in FIG. 9). When a process step has been identified in a recording by a scorer, and the ending of the process step is ascertained, the scorer may apply an appropriate process step tag (e.g., selected from process step tag interface 1204 in FIG. 12). Accordingly, a data model implemented by process step tag module 1014 may add a new process tag to a process step tags table or other data structure, stored as annotated process steps 1032 in FIG. 10. A unique ID of this process step tag represents an end tag for the process step, i.e., a point in time when the process step is deemed to have completed. This same process tag ID also represents a starting/beginning tag for a next process step to be determined.

Figure 23:
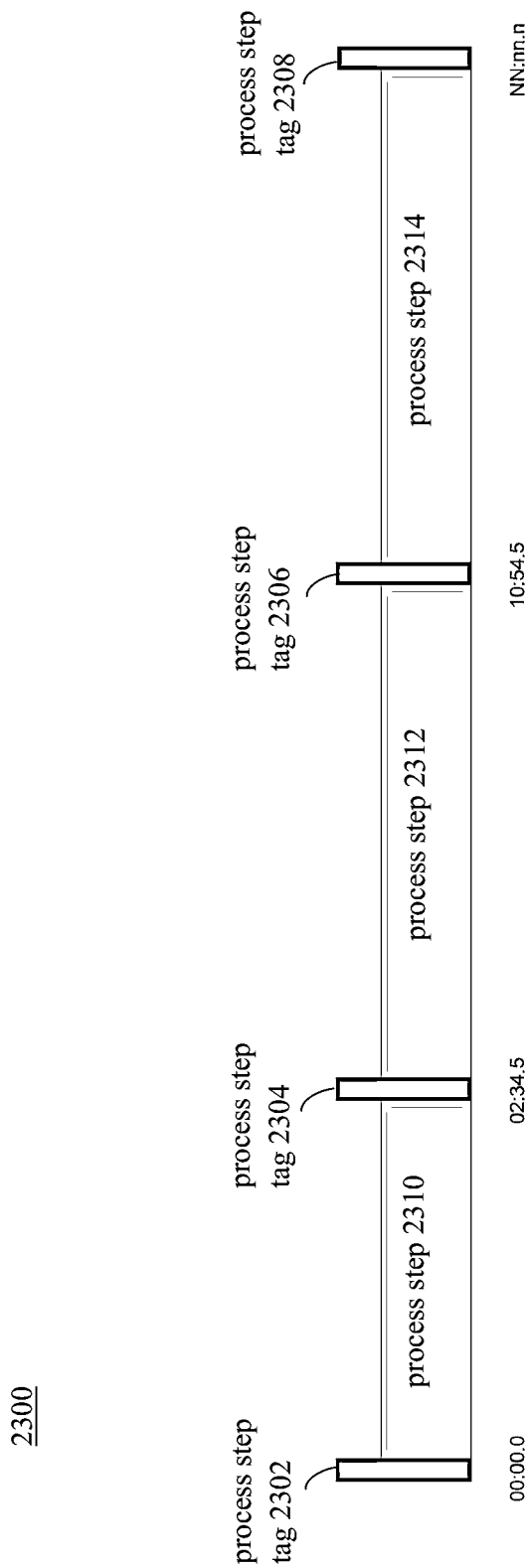
FIG. 23 shows a time line indicating process step tags applied to a recording, according to an example embodiment of the present invention.

For instance, FIG. 23 shows a time line 2300 indicating process step tags applied to a recording, according to an example embodiment of the present invention. In FIG. 23, four process step tags are indicated on timeline 2300, including a first process step tag 2302, a second process step tag 2304, a third process step tag 2306, and a fourth process step tag 2308. Process step tags 2302-2308 separate three process steps, including a first process step 2310, a second process step 2312, and a third process step 2314. In FIG. 23, process step tag 2304 represents both an end tag for first process step 2310 and a beginning tag of second process step 2312. If a value of second process step tag 2304 is modified (e.g., by a reviewer to correct an inaccuracy by the scorer), the durations of both of first and second process steps 2310 and 2312 are also changed, because they both depend on the value of second process step tag 2304 to determine their respective durations.

This construction allows for simple and efficient adjustment by a quality assurance (QA) operator. To correct an inaccurately applied process step tag, the QA operator could simply enter the correct duration point data, drag and drop a value onto the tag, or move the tag forward or backward in a timeline GUI by dragging the tag to the appropriate point. Any adjustments would simultaneously adjust the process steps the process step tag is serving as beginning tag and/or ending tag. Additionally, using this construct, any number of parallel operations may be tracked independently.

Finally, a value of a process tag can be derived from any number of mechanisms. For example, a current position of any media player (e.g., recording player interface 1104) may supply the duration point value of a recording at the instant the process step is applied. This enables playback to be performed at speeds other than real time, either faster or slower, as deemed appropriate by the scorer. Faster speeds may enable the scorer to more quickly process a record, while slower speeds may be needed to ensure high degrees of precision. Alternatively, a system clock computer on which the application is being may provide timestamp information if a live process was being observed and scored.

III. Example Computer Implementations

Figure 24:
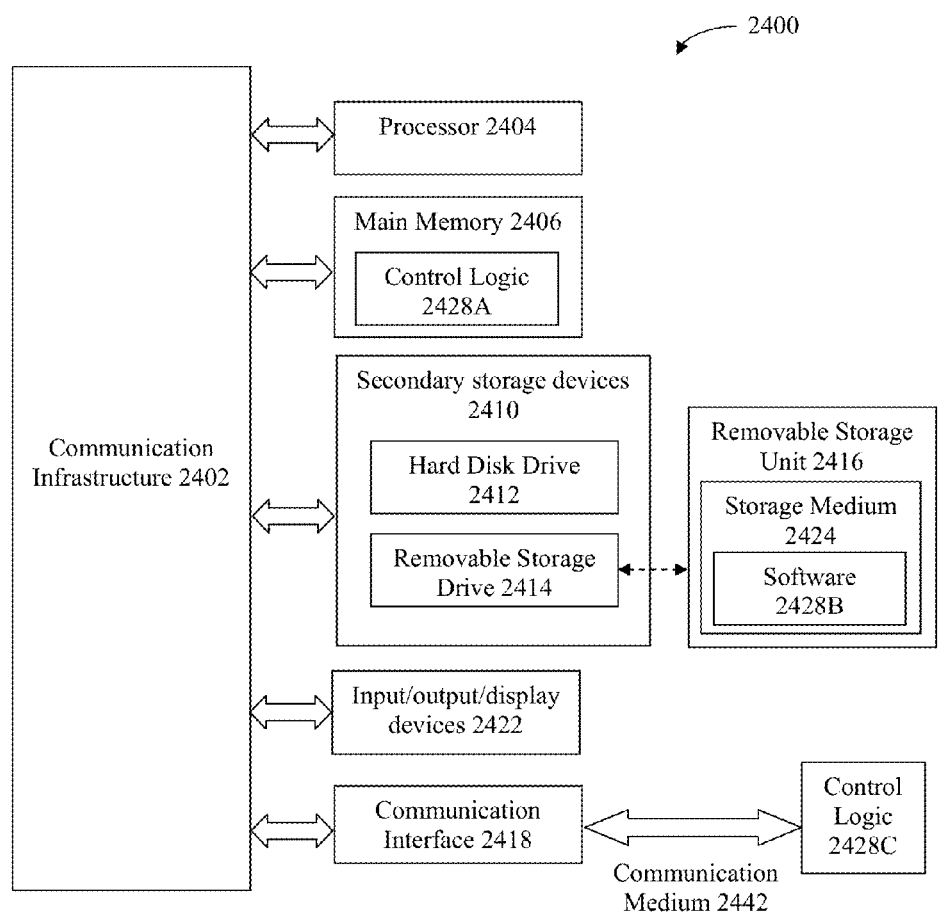
FIG. 24 shows a block diagram of an example computer system in which embodiments of the present invention may be implemented.

The embodiments described herein, including systems, methods/processes, and/or apparatuses, may be implemented using well known servers/computers, such as a computer 2400 shown in FIG. 24. For example, embodiments of process monitoring system 104 (FIG. 1), process annotation system 302 (FIG. 3), and process analysis system 306 (FIG. 3) can be implemented using one or more computers 2400. Computer 402 (FIG. 4), computers 502a and 502b (FIG. 5), server 506 (FIG. 5), and/or computer 1002 (FIG. 10) may each be implemented using one or more computers 2400.

Computer 2400 can be any commercially available and well known computer capable of performing the functions described herein, such as computers available from International Business Machines, Apple, Sun, HP, Dell, Cray, etc. Computer 2400 may be any type of computer, including a desktop computer, a server, etc.

Computer 2400 includes one or more processors (also called central processing units, or CPUs), such as a processor 2404. Processor 2404 is connected to a communication infrastructure 2402, such as a communication bus. In some embodiments, processor 2404 can simultaneously operate multiple computing threads.

Computer 2400 also includes a primary or main memory 2406, such as random access memory (RAM). Main memory 2406 has stored therein control logic 2428A (computer software), and data.

Computer 2400 also includes one or more secondary storage devices 2410. Secondary storage devices 2410 include, for example, a hard disk drive 2412 and/or a removable storage device or drive 2414, as well as other types of storage devices, such as memory cards and memory sticks. For instance, computer 2400 may include an industry standard interface, such a universal serial bus (USB) interface for interfacing with devices such as a memory stick. Removable storage drive 2414 represents a floppy disk drive, a magnetic tape drive, a compact disk drive, an optical storage device, tape backup, etc.

Removable storage drive 2414 interacts with a removable storage unit 2416. Removable storage unit 2416 includes a computer useable or readable storage medium 2424 having stored therein computer software 2428B (control logic) and/ or data. Removable storage unit 2416 represents a floppy disk, magnetic tape, compact disk, DVD, optical storage disk, or any other computer data storage device. Removable storage drive 2414 reads from and/or writes to removable storage unit 2416 in a well known manner.

Computer 2400 also includes input/output/display devices 2422, such as monitors, keyboards, pointing devices, etc.

Computer 2400 further includes a communication or network interface 2418. Communication interface 2418 enables the computer 2400 to communicate with remote devices. For example, communication interface 2418 allows computer 2400 to communicate over communication networks or mediums 2442 (representing a form of a computer useable or readable medium), such as LANs, WANs, the Internet, etc. Network interface 2418 may interface with remote sites or networks via wired or wireless connections.

Control logic 2428C may be transmitted to and from computer 2400 via the communication medium 2442.

Any apparatus or manufacture comprising a computer useable or readable medium having control logic (software) stored therein is referred to herein as a computer program product or program storage device. This includes, but is not limited to, computer 2400, main memory 2406, secondary storage devices 2410, and removable storage unit 2416. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing process monitoring system 104, process annotation system 302, process analysis system 306, process annotation tool 408 (FIG. 4), server 506, process annotation tools 510a and 510b (FIG. 5), process annotation tool 1008 (FIG. 10), user interface generator 1010 (FIG. 10), recording player module 1012 (FIG. 10), process step tag module 1014 (FIG. 10), attributes applicator module 1016 (FIG. 10), discoveries applicator module 1018 (FIG. 10), flowchart 600 (FIG. 6), flowchart 900 (FIG. 9), flowchart 1700 (FIG. 17), flowchart 1800 (FIG. 18), flowchart 1900 (FIG. 19), flowchart 2000 (FIG. 20), flowchart 2100 (FIG. 21), flowchart 2200 (FIG. 22) (including any one or more steps of flowcharts 600, 900, 1700, 1800, 1900, 2000, 2100, and 2200), and/or further embodiments of the present invention described herein. Embodiments of the invention are directed to computer program products comprising such logic (e.g., in the form of program code or software) stored on any computer useable medium. Such program code, when executed in one or more processors, causes a device to operate as described herein.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for annotating a process instance captured in association with a process study defined for a call center, and for refining the process study, comprising:
providing a user interface that enables a user to interact with a recording of a dynamic service process being performed and included in the process instance, the dynamic service process conducted according to the process study and captured by a process monitoring system, wherein the dynamic service process being performed is a phone call between an agent and a customer, and the recording includes at least one of an audio or a video conversation between the agent and the customer during the phone call, wherein the phone call is conducted in association with a hierarchical process tree of process steps;
receiving a process step tag at the user interface indicating a process step selected by the user from a first plurality of process steps of the hierarchical process tree and applied by the user to a section of the recording, wherein the user is enabled to apply process step tags to the at least one of the audio or the video conversation;
for at least one attribute, receiving at the user interface an attribute value selected from a list of attribute values and applied by the user to the process instance;
receiving at the user interface discovery information applied by the user to the process instance that is an observation made by the user based on interacting with the recording;
generating, by at least one hardware computer processor, annotation information associated with the process instance that includes at least the process step tag, the discovery information, and the selected attribute value;
decomposing, by the at least one hardware computer processor, the selected process step into a second plurality of process steps based on a study of the selected process step;
displaying the first plurality of process steps and the second plurality of process steps in different levels of the hierarchical process tree, the first plurality of process steps and the second plurality of process steps being selectable in the hierarchical process tree to be applied as the process step tags to the recording;
annotating a plurality of process instances with additional annotation information;
calibrating, by the at least one hardware computer processor, the annotated plurality of process instances, said calibrating including reviewing the process step selected by the user;
performing, by the at least one hardware computer processor, quality assurance on a first percentage of the annotated and calibrated plurality of process instances when the process study is in a first period within a lifecycle, and on a second percentage of the annotated and calibrated plurality of process instances when the process study has progressed within the lifecycle, wherein a quality assurance representative performs corrections to the annotated and calibrated plurality of process instances and provides feedback to the user with regard to the corrections, and allows for adjustments of future process instance reviews according to the feedback and number of corrections;
analyzing, by the at least one hardware computer processor, based on the quality assurance, the annotated and calibrated plurality of process instances to measure how the process study is performing and to determine one or more improvements to the process study;
identifying, based on the analyzing and using of at least one of an average handle time metric, a work time distribution metric, or a standard deviation metric, a process step of the hierarchical process tree that has high variation;
decomposing, by the at least one hardware computer processor, the identified process step into a plurality of sub-steps to identify a sub-step of the identified process step that accounts for the high variation;
modifying, by the at least one hardware computer processor, based on the identified sub-step, the process study, said modifying including at least one of adding a new attribute, adding a new process step to the hierarchical tree, modifying an existing process step in the hierarchical tree, or removing a non-occurring process step from the hierarchical tree; and
benchmarking, by the at least one hardware computer processor, the modified process study against a different call center using a process catalog that encompasses standard process steps for a plurality of processes.

2. The method of claim 1, further comprising:
enabling the user to play the at least one of the audio or the video conversation; and
enabling the user to apply the process step tag indicating the process step to the section of the recording based on a content of the at least one of the audio or the video conversation during the section.

3. The method of claim 1, wherein the first plurality of process steps are selected from the standard process steps of the process catalog.

4. The method of claim 1, further comprising:
enabling the discovery information to be provided to at least one subsequent user with at least one further process instance.

5. The method of claim 1, further comprising:
generating the new attribute configured to be evaluated for the annotated and calibrated plurality of process instances based on said analyzing.

6. A process annotation system for annotating a process instance captured in association with a process study defined for a call center, and for refining the process study, the process annotation system comprising:
one or more hardware computer processors; and memory that stores program code for execution by the one or more hardware computer processors, the program code configured to implement:

a user interface generator that includes a recording player module configured to enable a user to interact with a recording of a dynamic service process being performed and included in the process instance, the dynamic service process conducted according to the process study and captured by a process monitoring system, wherein the dynamic service process being performed is a phone call between an agent and a customer, and the recording includes at least one of an audio or a video conversation between the agent and the customer during the phone call, wherein the phone call is conducted in association with a hierarchical process tree of process steps;

a process step tag module configured to receive a process step tag indicating a process step selected by the user from a first plurality of process steps of the hierarchical process tree and applied by the user to a section of the recording, wherein the user is enabled to apply process step tags to the at least one of the audio or the video conversation;

an attributes applicator module configured to, for at least one attribute, receive an attribute value selected from a list of attribute values and applied by the user to the process instance; and a discoveries applicator module configured to receive discovery information applied by the user to the process instance that is an observation made by the user based on interacting with the recording;

wherein the user interface module is configured to generate annotation information associated with the process instance that includes at least the process step tag, the discovery information, and the selected attribute value;

wherein the selected process step is decomposed into a second plurality of process steps based on a study of the selected process step;

wherein the first plurality of process steps and the second plurality of process steps are displayed in different levels of the hierarchical process tree, the first plurality of process steps and the second plurality of process steps being selectable in the hierarchical process tree to be applied as the process step tags to the recording;

wherein a plurality of process instances is annotated with additional annotation information;

wherein the annotated plurality of process instances is calibrated by at least reviewing the process step selected by the user;

wherein quality assurance is performed on first percentage of the annotated and calibrated plurality of process instances when the process study is in a first period within a lifecycle, and on a second percentage of the annotated and calibrated plurality of process instances when the process study has progressed within the lifecycle, wherein a quality assurance representative performs corrections to the annotated and calibrated plurality of process instances and provides feedback to the user with regard to the corrections, and allows for adjustments of future process instance reviews according to the feedback and number of corrections;

wherein, based on the quality assurance, the annotated and calibrated plurality of process instances is analyzed to measure how the process study is performing and to determine one or more improvements to the process study;

wherein, based on the analysis and use of at least one of an average handle time metric, a work time distribution metric, or a standard deviation metric, a process step of the hierarchical process tree is identified that has high variation;

wherein the identified process step is decomposed into a plurality of sub-steps to identify a sub-step of the identified process step that accounts for the high variation;

wherein, based on the identified sub-step, the process study is modified by at least one of adding a new attribute, adding a new process step to the hierarchical tree, modifying an existing process step in the hierarchical tree, or removing a non-occurring process step from the hierarchical tree; and wherein the modified process study is benchmarked against a different call center using a process catalog that encompasses standard process steps for a plurality of processes.

7. The process annotation system of claim 6, wherein the recording player module is configured to enable the user to play the at least one of the audio or the video conversation; and wherein the process step tag module is configured to enable the user to select the process step tag based on a content of the at least one of the audio or the video conversation.

8. The process annotation system of claim 6, wherein the first plurality of process steps are selected from the standard process steps of the process catalog.

9. The process annotation system of claim 6, wherein the discovery information is enabled to be provided to at least one subsequent user with at least one further process instance.

10. The process annotation system of claim 6, wherein the new attribute is configured to be evaluated for the annotated and calibrated plurality of process instances based on the analysis.

11. A computer program product comprising a non-transitory computer-readable medium having computer program logic recorded thereon for enabling at least one hardware computer processor to execute a method for annotating a process instance captured in association with a process study defined for a call center and for refining the process study, the method comprising:

providing a user interface that enables a user to interact with a recording of a dynamic service process being performed and included in the process instance, the dynamic service process conducted according to the process study and captured by a process monitoring system, wherein the dynamic service process being performed is a phone call between an agent and a customer, and the recording includes at least one of an audio or a video conversation between the agent and the customer during the phone call, wherein the phone call is conducted in association with a hierarchical process tree of process steps;

receiving a process step tag at the user interface indicating a process step selected by the user from a first plurality of process steps of the hierarchical process tree and applied by the user to a section of the recording, wherein the user is enabled to apply process step tags to the at least one of the audio or the video conversation;

for at least one attribute, receiving at the user interface an attribute value selected from a list of attribute values and applied by the user to the process instance;

receiving at the user interface discovery information applied by the user to the process instance that is an observation made by the user based on interacting with the recording;

generating, by the at least one hardware computer processor, annotation information associated with the process instance that includes at least the process step tag, the discovery information, and the selected attribute value;

decomposing, by the at least one hardware computer processor, the selected process step into a second plurality of process steps based on a study of the selected process step;

displaying the first plurality of process steps and the second plurality of process steps in different levels of the hierarchical process tree, the first plurality of process steps and the second plurality of process steps being selectable in the hierarchical process tree to be applied as the process step tags to the recording;

annotating a plurality of process instances with additional annotation information;

calibrating, by the at least one hardware computer processor, the annotated plurality of process instances, said calibrating including reviewing the process step selected by the user;

performing, by the at least one hardware computer processor, quality assurance on a first percentage of the annotated and calibrated plurality of process instances when the process study is in a first period within a lifecycle, and on a second percentage of the annotated and calibrated plurality of process instances when the process study has progressed within the lifecycle, wherein a quality assurance representative performs corrections to the annotated and calibrated plurality of process instances and provides feedback to the user with regard to the corrections, and allows for adjustments of future process instance reviews according to the feedback and number of corrections;

analyzing, by the at least one hardware computer processor, based on the quality assurance, the annotated and calibrated plurality of process instances to measure how the process study is performing and to determine one or more improvements to the process study;

identifying, based on the analyzing, and using of at least one of an average handle time metric, a work time distribution metric, or a standard deviation metric, a process step of the hierarchical process tree that has high variation;

decomposing, by the at least one hardware computer processor, the identified process step into a plurality of sub-steps to identify a sub-step of the identified process step that accounts for the high variation;

modifying, by the at least one hardware computer processor, based on the identified sub-step, the process study, said modifying including at least one of adding a new attribute, adding a new process step to the hierarchical tree, modifying an existing process step in the hierarchical tree, or removing a non-occurring process step from the hierarchical tree; and benchmarking, by the at least one hardware computer processor, the modified process study against a different call center using a process catalog that encompasses standard process steps for a plurality of processes.

12. The computer program product of claim 11, the method further comprising:

enabling the user to play the at least one of the audio or the video conversation; and enabling the user to apply the process step tag indicating the process step to the section of the recording based on a content of the at least one of the audio or the video conversation during the section.

13. The computer program product of claim 11, wherein the first plurality of process steps are selected from the standard process steps of the process catalog.

14. The computer program product of claim 11, the method further comprising:

enabling the discovery information to be provided to at least one subsequent user with at least one further process instance.

15. The computer program product of claim 11, the method further comprising:

generating the new attribute configured to be evaluated for the annotated and calibrated plurality of process instances based on said analyzing.

\* \* \* \* \*

UNITED STATES PATENT AND TRADEMARK OFFICE
CERTIFICATE OF CORRECTION

PATENT NO. : 8,781,883 B2
APPLICATION NO. : 12/415128
DATED : July 15, 2014
INVENTOR(S) : Justin Whitaker et al.

It is certified that error appears in the above-identified patent and that said Letters Patent is hereby corrected as shown below:

On the title page, item (54), and in the specification, column 1, line 1-5, in "Title", delete "TIME MOTION METHOD, SYSTEM AND COMPUTER PROGRAM PRODUCT FOR ANNOTATING AND ANALYZING A PROCESS INSTANCE USING TAGS, ATTRIBUTE VALUES, AND DISCOVERY INFORMATION" and insert -- PROCESS STUDY REFINEMENT FOR BENCHMARKING BETWEEN DIFFERENT CALL CENTERS --, therefor.

Signed and Sealed this
Thirty-first Day of March, 2015

Michelle K. Lee
*Director of the United States Patent and Trademark Office*